(12) United States Patent
Kihara

(10) Patent No.: US 10,900,784 B2
(45) Date of Patent: Jan. 26, 2021

(54) PHYSICAL QUANTITY SENSOR, PHYSICAL QUANTITY SENSOR DEVICE, COMPOSITE SENSOR DEVICE, INERTIAL MEASUREMENT UNIT, VEHICLE POSITIONING APPARATUS, PORTABLE ELECTRONIC APPARATUS, ELECTRONIC APPARATUS, AND VEHICLE

(71) Applicant: Seiko Epson Corporation, Tokyo (JP)

(72) Inventor: Ryuji Kihara, Matsumoto (JP)

(73) Assignee: Seiko Epson Corporation

( * ) Notice: Subject to any disclaimer, the term of this patent is extended or adjusted under 35 U.S.C. 154(b) by 151 days.

(21) Appl. No.: 16/201,257

(22) Filed: Nov. 27, 2018

(65) Prior Publication Data

US 2019/0162539 A1  May 30, 2019

(30) Foreign Application Priority Data

Nov. 28, 2017 (JP) ................................ 2017-228403

(51) Int. Cl.
*G01C 19/5733* (2012.01)
*G01C 19/5769* (2012.01)
*G01P 15/125* (2006.01)
*G01P 15/08* (2006.01)

(52) U.S. Cl.
CPC ..... *G01C 19/5733* (2013.01); *G01C 19/5769* (2013.01); *G01P 15/125* (2013.01); *G01P 2015/0831* (2013.01)

(58) Field of Classification Search
None
See application file for complete search history.

(56) References Cited

U.S. PATENT DOCUMENTS

| | | | | |
|---|---|---|---|---|
| 4,321,500 A | * | 3/1982 | Paros | G01L 9/0022 310/321 |
| 5,226,321 A | * | 7/1993 | Varnham | G01C 19/5684 73/504.13 |
| 5,473,945 A | * | 12/1995 | Grieff | G01C 19/5719 73/504.04 |
| 5,757,103 A | * | 5/1998 | Lee | G01C 19/574 310/309 |

(Continued)

FOREIGN PATENT DOCUMENTS

EP   2 175 280 A1   4/2010
EP   2 857 347 A1   4/2015

(Continued)

OTHER PUBLICATIONS

Extended European Search Report for Application No. EP 18 20 8527 dated Mar. 29, 2019 (11 pages).

*Primary Examiner* — Paul M. West
*Assistant Examiner* — Mark A Shabman
(74) *Attorney, Agent, or Firm* — Harness, Dickey & Pierce, P.L.C.

(57) ABSTRACT

A physical quantity sensor includes a pivoting mass having a first plate on one side of a rotation axis, a second plate on the other side of the rotation axis, and a link connecting the first plate to the second plate. The link includes a first slit, a second slit on one side of the first slit toward the first plate, and a third slit on the other side of the first slit toward the second plate. The second and third slits are also deviated toward a peripheral edge of the link with respect to the first slit.

20 Claims, 22 Drawing Sheets

(56) References Cited

U.S. PATENT DOCUMENTS

| | | | |
|---|---|---|---|
| 5,806,365 A * | 9/1998 | Zunino | G01P 15/0802 |
| | | | 73/504.03 |
| 5,905,203 A | 5/1999 | Flach et al. | |
| 8,746,066 B2 | 6/2014 | Classen et al. | |
| 2004/0187578 A1 | 9/2004 | Malametz et al. | |
| 2009/0296181 A1 | 12/2009 | Omori et al. | |
| 2011/0094302 A1 * | 4/2011 | Schofield | G01C 19/56 |
| | | | 73/504.12 |
| 2012/0125101 A1 * | 5/2012 | Seeger | G01C 19/5755 |
| | | | 73/504.14 |
| 2015/0040667 A1 | 2/2015 | Tanaka | |

FOREIGN PATENT DOCUMENTS

| | | |
|---|---|---|
| JP | H09-189716 A | 7/1997 |
| JP | 2008-164827 A | 7/2008 |
| JP | 2009-288359 A | 12/2009 |
| JP | 2018-163120 A | 10/2018 |

\* cited by examiner

PHYSICAL QUANTITY SENSOR, PHYSICAL QUANTITY SENSOR DEVICE, COMPOSITE SENSOR DEVICE, INERTIAL MEASUREMENT UNIT, VEHICLE POSITIONING APPARATUS, PORTABLE ELECTRONIC APPARATUS, ELECTRONIC APPARATUS, AND VEHICLE

BACKGROUND

1. Technical Field

The present invention relates to a physical quantity sensor, a physical quantity sensor device, a composite sensor device, an inertial measurement unit, a vehicle positioning apparatus, a portable electronic apparatus, an electronic apparatus, and a vehicle.

2. Related Art

A physical quantity sensor (acceleration sensor) disclosed in JP-A-9-189716 includes a movable portion, a support portion, and a beam which connects the support portion to the movable portion such that the movable portion is seesaw-rotatable (pivotable) with respect to the support portion about a predetermined rotation axis. The physical quantity sensor also includes a first fixed detection electrode facing a part of the movable portion on one side of the rotation axis and a second fixed detection electrode facing a part thereof the other side. In this configuration, in a case where an acceleration in a Z axis direction (a normal direction of the movable portion) is applied, the movable portion is seesaw-rotated, and thus an electrostatic capacitance between the movable portion and the first fixed detection electrode and an electrostatic capacitance between the movable portion and the second fixed detection electrode changes. Thus, the physical quantity sensor disclosed in JP-A-9-189716 can measure the acceleration in the Z axis direction on the basis of the changes in the electrostatic capacitances.

However, in this configuration, since the movable portion is seesaw-rotated while the beam is deformed in a torsional manner, a relatively large stress is applied to a connection portion between the beam and the support portion or a connection portion between the beam and the movable portion. Especially in a case where an impact is applied, the movable portion is displaced, and thus a relatively large stress is applied to the connection portion between the beam and the support portion or the connection portion between the beam and the movable portion. Thus, there is a problem in that the portions may be damaged, and favorable mechanical strength cannot be exerted.

SUMMARY

An advantage of some aspects of the invention is to provide a physical quantity sensor, a physical quantity sensor device, a composite sensor device, an inertial measurement unit, a vehicle positioning apparatus, a portable electronic apparatus, an electronic apparatus, and a vehicle, having favorable mechanical strength.

The invention can be implemented as the following configurations.

A physical quantity sensor includes a substrate; and an element section that is supported at the substrate, in which the element section includes a fixed support that is attached to the substrate, a movable portion, and a support beam that connects the fixed support to the movable portion, in which the movable portion is displaceable with the support beam as a rotation axis, in which the movable portion includes a first mass part that is located on one side of a first direction orthogonal to the rotation axis via the rotation axis, a second mass part that is located on the other side of the first direction, and a link that is connected to the support beam, and connects the first mass part to the second mass part, in which the link includes a first slit, a second slit that is located on the first mass part side of the first slit, and a third slit that is located on the second mass part side of the first slit, and, in which, in a case where an axis along the first direction through the center of the first slit in a plan view is referred to as a first central axis, an axis along the first direction through the center of the second slit in a plan view is referred to as a second central axis, and an axis along the first direction through the center of the third slit in a plan view is referred to as a third central axis, each of the second central axis and the third central axis is deviated in a direction of the rotation axis with respect to the first central axis.

With this configuration, it is possible to more effectively alleviate stress concentration on a connection portion between the support beam and the link. Thus, it is possible to provide the physical quantity sensor having favorable mechanical strength.

In the physical quantity sensor, it is preferable that the first slit is longitudinally extended along the first direction.

With this configuration, it is possible to more effectively alleviate stress concentration on a connection portion between the support beam and the link.

In the physical quantity sensor, it is preferable that each of both ends of the first slit in the first direction is rounded.

With this configuration, it is possible to alleviate stress concentration on the first slit.

In the physical quantity sensor, it is preferable that each of the second slit and the third slit is longitudinally extended along the first direction.

With this configuration, it is possible to more effectively alleviate stress concentration on a connection portion between the support beam and the link.

In the physical quantity sensor, it is preferable that each of both ends of the second slit in the first direction is rounded, and each of both ends of the third slit in the first direction is rounded.

With this configuration, it is possible to alleviate stress concentration on the second slit and the third slit.

In the physical quantity sensor, it is preferable that each of the second slit and the third slit is disposed in a plurality along the first direction.

With this configuration, it is possible to more effectively alleviate stress concentration on a connection portion between the support beam and the link.

In the physical quantity sensor, it is preferable that each of the second slit and the third slit has a region overlapping a region to which the first slit extends in the first direction.

With this configuration, it is possible to more effectively alleviate stress concentration on a connection portion between the support beam and the link.

In the physical quantity sensor, it is preferable that each of the second slit and the third slit has a region overlapping a region to which the first slit extends in a direction along the rotation axis.

With this configuration, it is possible to more effectively alleviate stress concentration on a connection portion between the support beam and the link.

In the physical quantity sensor, it is preferable that the first slit is disposed in a plurality in a direction along the rotation axis.

With this configuration, it is possible to more effectively alleviate stress concentration on a connection portion between the support beam and the link.

In the physical quantity sensor, it is preferable that each of the second slit and the third slit is disposed in a plurality in a direction along the rotation axis.

With this configuration, it is possible to more effectively alleviate stress concentration on a connection portion between the support beam and the link.

It is preferable that the physical quantity sensor measures acceleration.

With this configuration, it is possible to provide the highly convenient physical quantity sensor.

A physical quantity sensor device includes the physical quantity sensor; and a circuit element.

With this configuration, it is possible to achieve the effect of the physical quantity sensor, and thus to provide the physical quantity sensor device with high reliability.

A composite sensor device includes a first physical quantity sensor that is the physical quantity sensor; and a second physical quantity sensor that measures a physical quantity which is different from a physical quantity measured by the first physical quantity sensor.

With this configuration, it is possible to achieve the effect of the physical quantity sensor, and thus to provide the composite sensor device with high reliability.

An inertial measurement unit includes the physical quantity sensor; and a control circuit that controls driving the physical quantity sensor.

With this configuration, it is possible to achieve the effect of the physical quantity sensor, and thus to provide the inertial measurement unit with high reliability.

A vehicle positioning apparatus includes the inertial measurement unit; a reception section that receives a satellite signal on which position information is superimposed from a positioning satellite; an acquisition section that acquires position information of the reception section on the basis of the received satellite signal; an operating section that calculates an attitude of a vehicle on the basis of inertial data output from the inertial measurement unit; and a calculation section that calculates a position of the vehicle by correcting the position information on the basis of the calculated attitude.

With this configuration, it is possible to achieve the effect of the inertial measurement unit, and thus to provide the vehicle positioning apparatus with high reliability.

A portable electronic apparatus includes the physical quantity sensor; a case in which the physical quantity sensor is accommodated; a processing section that is accommodated in the case and processes data output from the physical quantity sensor; a display section that is accommodated in the case; and a light transmissive cover that closes an opening of the case.

With this configuration, it is possible to achieve the effect of the physical quantity sensor, and thus to provide the portable electronic apparatus with high reliability.

It is preferable that the portable electronic apparatus includes a satellite positioning system, and measures a movement distance or a movement trajectory of a user.

With this configuration, it is possible to provide the more highly convenient portable electronic apparatus.

An electronic apparatus includes the physical quantity sensor; and a control section that performs control on the basis of a measurement signal output from the physical quantity sensor.

With this configuration, it is possible to achieve the effect of the physical quantity sensor, and thus to provide the electronic apparatus with high reliability.

A vehicle includes the physical quantity sensor; and a control section that performs control on the basis of a measurement signal output from the physical quantity sensor.

With this configuration, it is possible to achieve the effect of the physical quantity sensor, and thus to provide the vehicle with high reliability.

It is preferable that the vehicle includes at least one system among an engine system, a brake system, and a keyless entry system, and the control section preferably controls the system on the basis of the measurement signal.

With this configuration, it is possible to control the system with high accuracy.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a physical quantity sensor, a physical quantity sensor device, a composite sensor device, an inertial measurement unit, a vehicle positioning apparatus, a portable electronic apparatus, an electronic apparatus, and a vehicle will be described in detail on the basis of embodiments illustrated in the accompanying drawings.

First Embodiment

First, a physical quantity sensor according to a first embodiment will be described.

Figure 1:
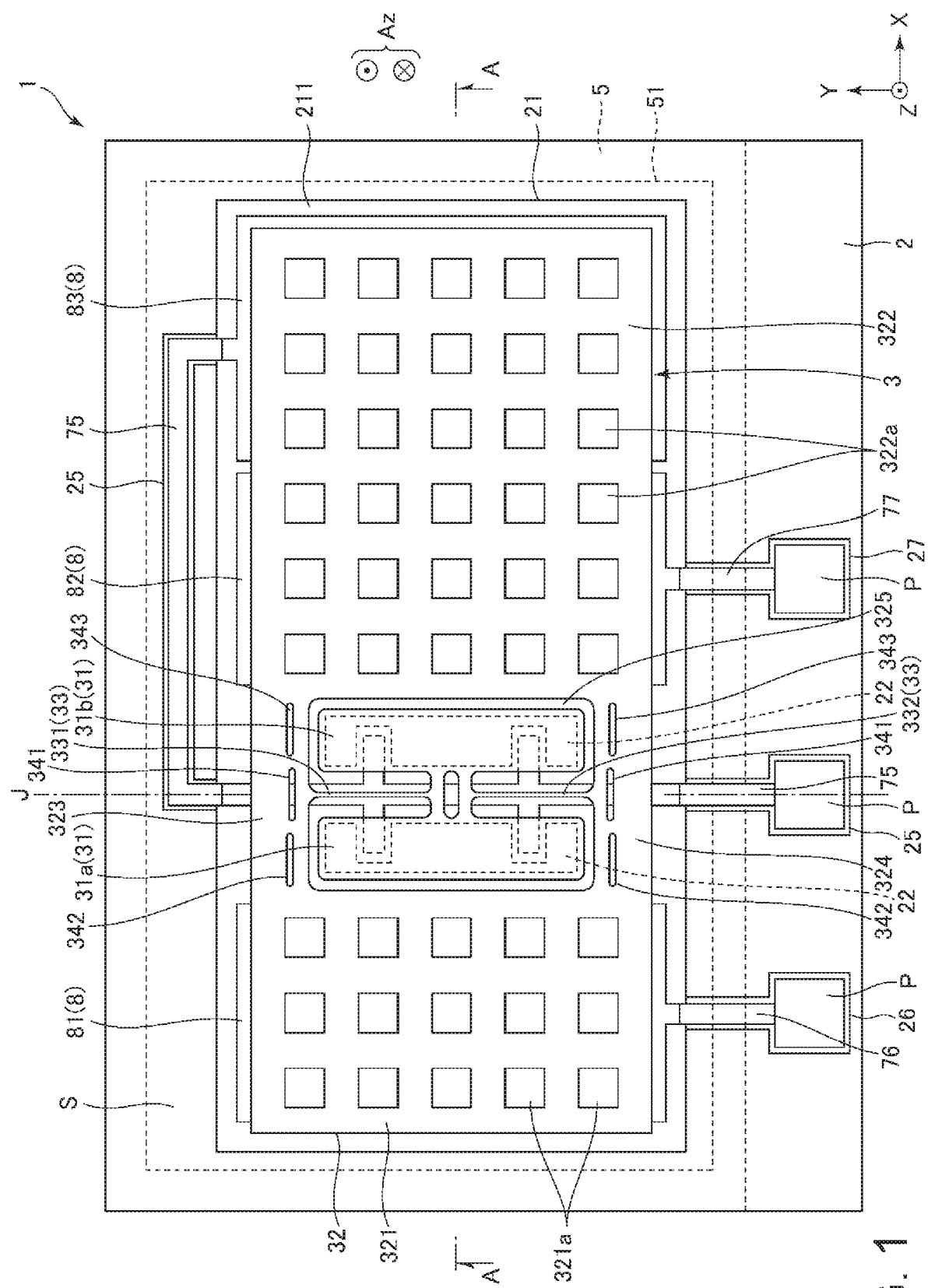
FIG. 1 is a plan view illustrating a physical quantity sensor according to a first embodiment.
Figure 2:
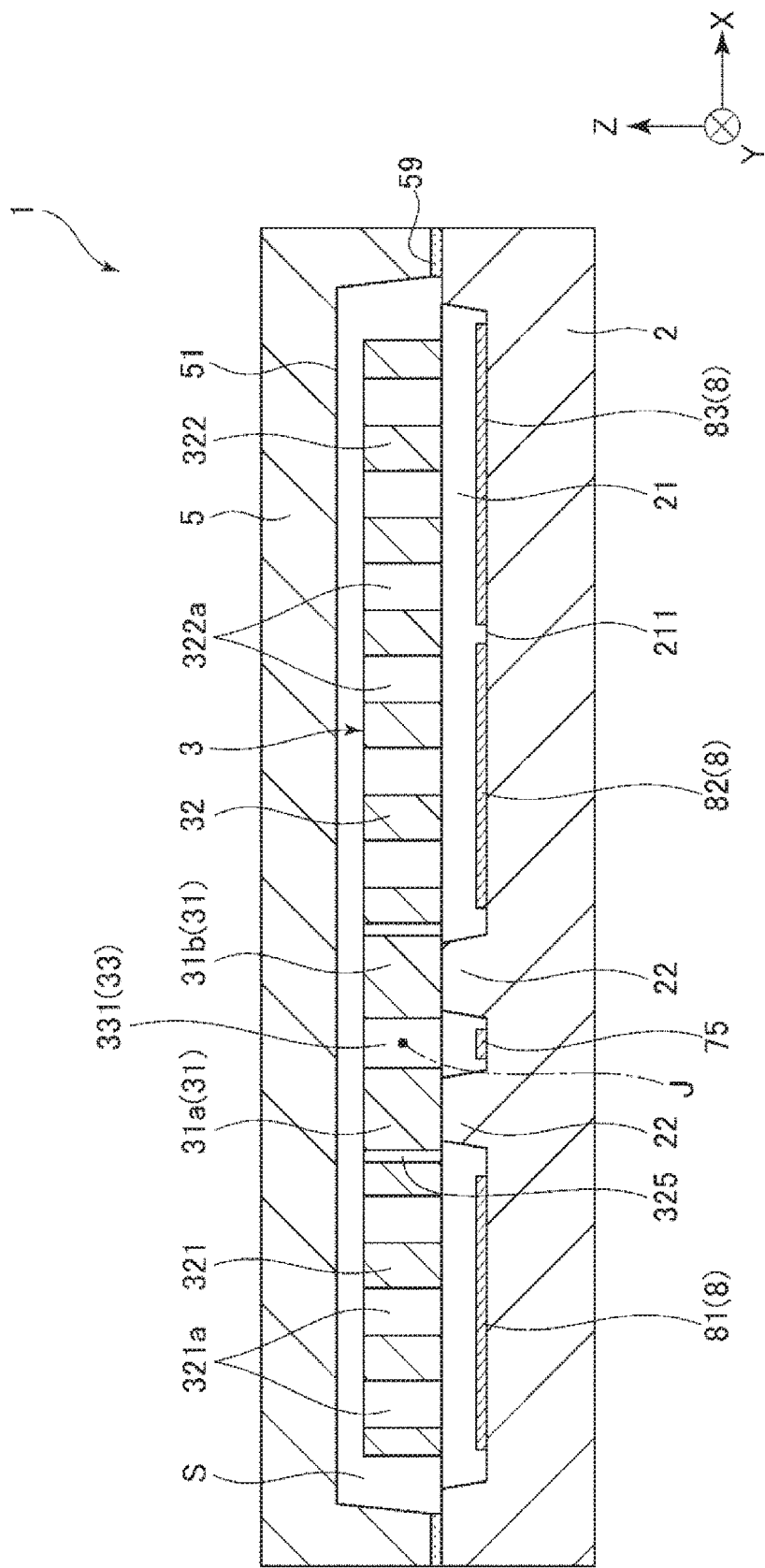
FIG. 2 is a sectional view taken along a line A-A in FIG. 1.
Figure 3:
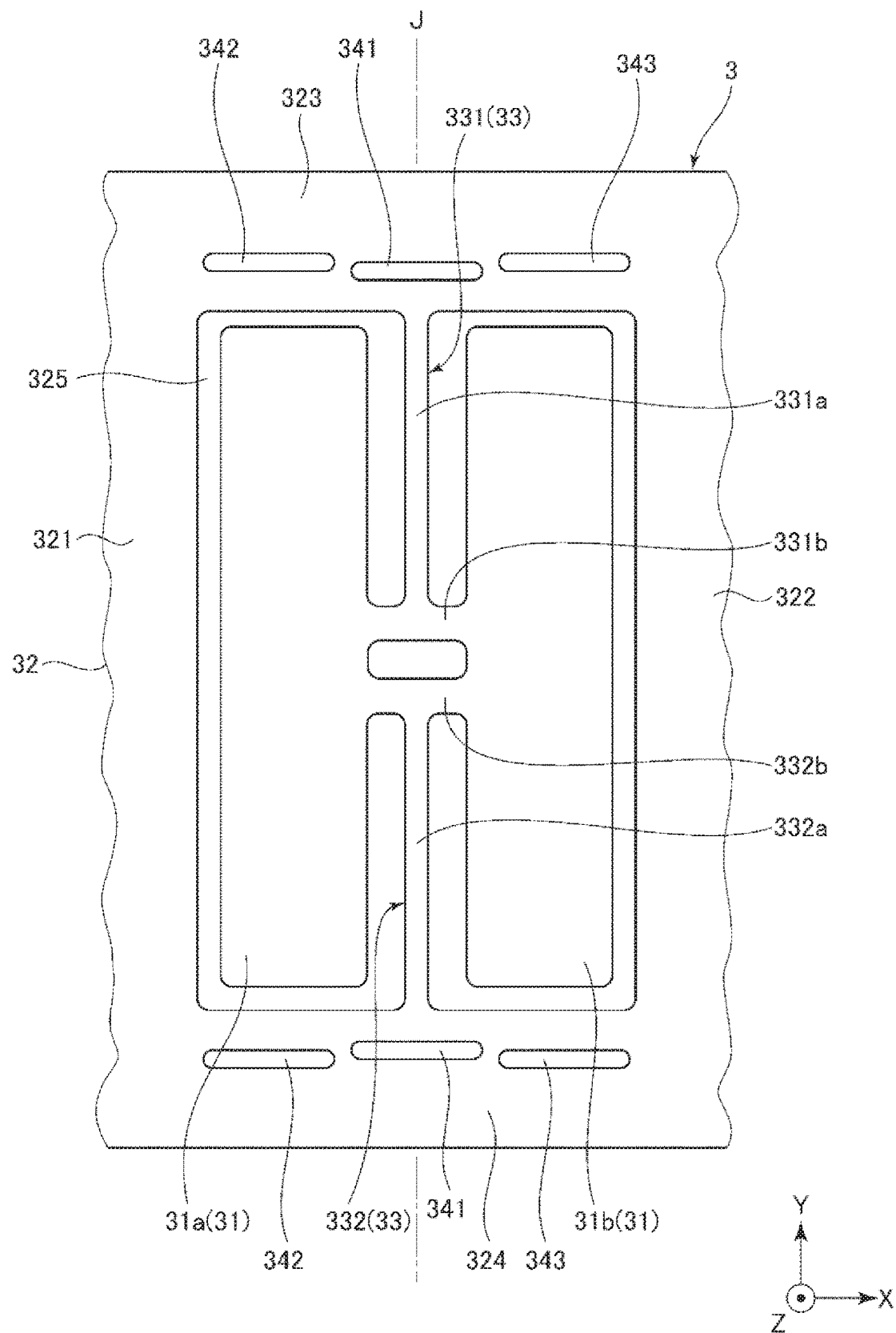
FIG. 3 is a partially enlarged plan view of an element section.
Figure 4:
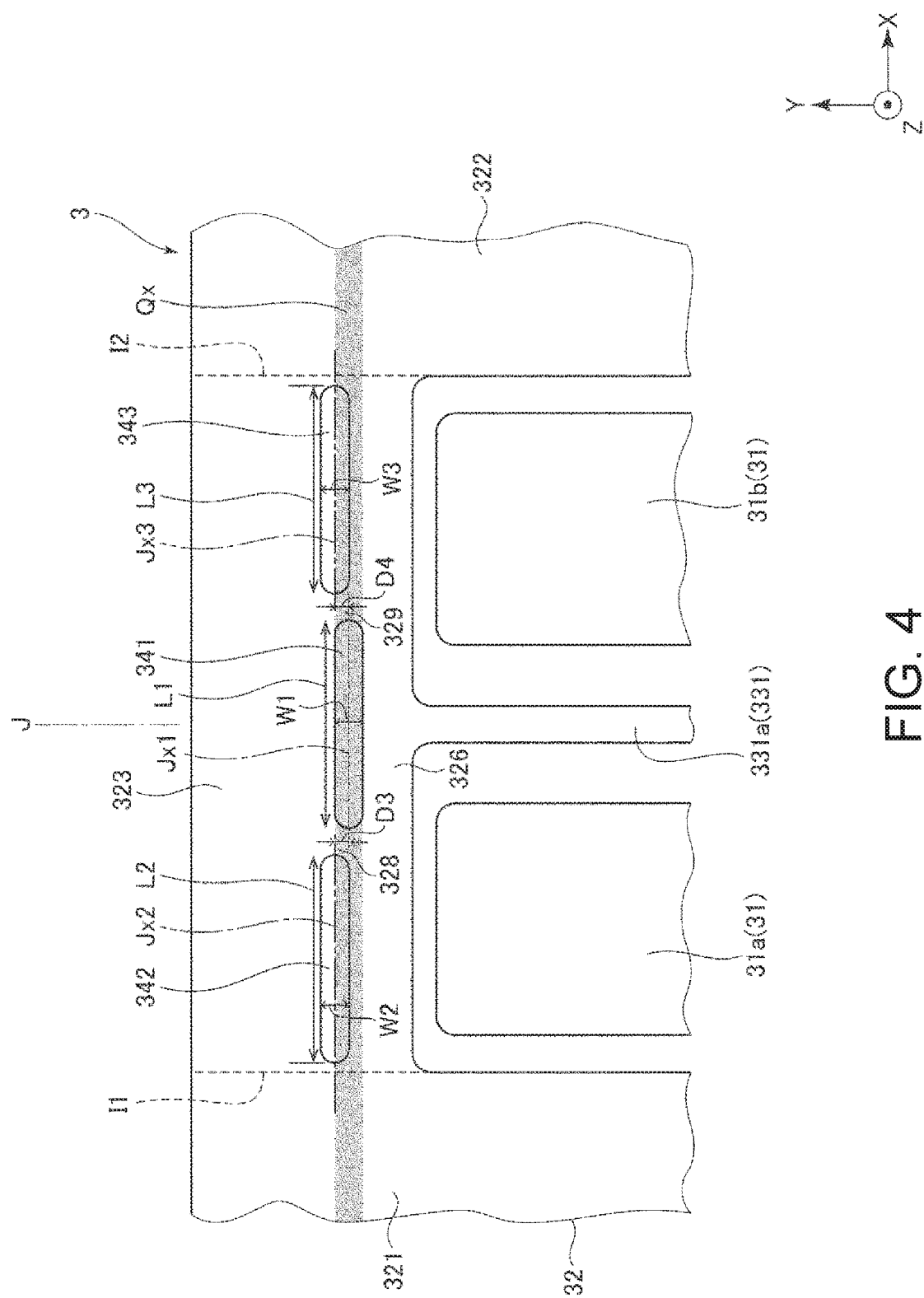
FIG. 4 is a partially enlarged plan view of an element section.
Figure 5:
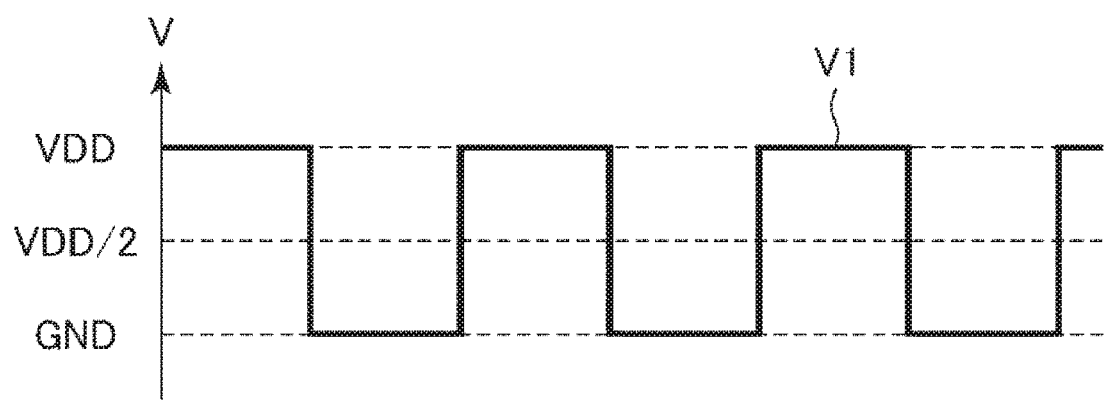
FIG. 5 is a graph illustrating drive voltages.

FIG. 1 is a plan view illustrating a physical quantity sensor according to the first embodiment. FIG. 2 is a sectional view taken along a line A-A in FIG. 1. FIG. 3 is a partially enlarged plan view of an element section. FIG. 4 is a partially enlarged plan view of an element section. FIG. 5 is a graph illustrating drive voltages.

An X axis, a Y axis, and a Z axis are illustrated in each drawing as three axes orthogonal to each other. Hereinafter, a direction parallel to the X axis will be referred to as an "X axis direction", a direction parallel to the Y axis will be referred to as a "Y axis direction", and a direction parallel to the Z axis will be referred to as a "Z axis direction". A tip side of each axis in an arrow direction will be referred to as a "positive side", and an opposite side thereto will be referred to as a "negative side". A Z axis direction positive side will be referred to as an "upper side", and a Z axis direction negative side will be referred to as a "lower side".

In the present specification, the term "orthogonal" includes not only a case where two elements intersect each other at exactly 90° but also a case where two elements intersect each other at an angle (for example, 90°±10°) which is slightly inclined from 90°. Specifically, a case where the X axis is inclined by about ±10° with respect to a normal direction to a YZ plane, a case where the Y axis is inclined by about ±10° with respect to a normal direction to an XZ plane, and a case where the Z axis is inclined by about ±10° with respect to a normal direction to an XY plane are also included in the term "orthogonal".

A physical quantity sensor 1 illustrated in FIG. 1 is an acceleration sensor which can measure an acceleration Az in the Z axis direction (vertical direction). The physical quantity sensor 1 includes a substrate 2, an element section (proof mass) 3 which is disposed on the substrate 2, and a lid 5 which is bonded to the substrate 2 so as to cover the element section 3.

As illustrated in FIG. 1, the substrate 2 has a tabular shape formed in a rectangular shape in a plan view. The substrate 2 has a depression 21 which is open to an upper surface side thereof. The depression 21 is formed to be larger than the element section 3 so as to include the element section 3 inside thereof in a plan view from the Z axis direction. The depression 21 functions as a relief for preventing the element section 3 from being brought into contact with the substrate 2.

The substrate 2 includes a mount 22 in the form of two protrusions provided on a bottom surface 211 of the depression 21. The element section 3 is bonded to an upper surface of the mount 22. Consequently, the element section 3 can be fixed to the substrate 2 in a state of being separated from (suspended above) the bottom surface 211 of the depression 21. The substrate 2 includes grooves 25, 26, and 27 which are open to the upper surface side thereof.

As the substrate 2, a glass substrate made of a glass material (for example, borosilicate glass such as Pyrex glass (registered trademark) or Tempax glass (registered trademark)) containing alkali metal ions (movable ions such as Na+) may be used. However, the substrate 2 is not particularly limited, and, for example, a silicon substrate or a ceramic substrate may be used. In a case where a silicon substrate is used as the substrate 2, from the viewpoint of preventing a short circuit, preferably, a high resistance silicon substrate is used, or a silicon substrate of which a silicon oxide film (insulating oxide) is formed on a surface through thermal oxidation or the like is used.

As illustrated in FIGS. 1 and 2, a first fixed electrode 81, a second fixed electrode 82, and a dummy electrode 83 are disposed to be separated from each other as electrodes 8 on the bottom surface 211 of the depression 21.

As illustrated in FIG. 1, wires 75, 76, and 77 are respectively disposed in the grooves 25, 26, and 27. One end of each of the wires 75, 76, and 77 is exposed to the outside of the lid 5, and functions as an electrode pad P for electrical connection to an external device. The wire 75 is electrically connected to the element section 3 on the mount 22, and is also electrically connected to the dummy electrode 83. The wire 76 is electrically connected to the first fixed electrode 81, and the wire 77 is electrically connected to the second fixed electrode 82.

As illustrated in FIG. 1, the lid 5 has a tabular shape formed in a rectangular shape in a plan view. As illustrated in FIG. 2, the lid 5 has a depression 51 which is open to a lower surface side (substrate 2 side) thereof. The lid 5 accommodates the element section 3 in the depression 51, and is bonded to the upper surface of the substrate 2. A storage space S accommodating the element section 3 is formed by the lid 5 and the substrate 2.

The storage space S is an airtight space. The storage space S is filled with an inert gas such as nitrogen, helium, or argon, and is preferably substantially at atmospheric pressure at a usage temperature (−40° C. to 120° C.) In a case where the storage space S is in the atmospheric pressure, viscous resistance increases such that a damping effect is enhanced, and thus vibration of the element section 3 can be made to rapidly cease. Thus, the measurement accuracy of the acceleration Az is improved.

As the lid 5, a silicon substrate may be used. However, the lid 5 is not limited to a silicon substrate, and, for example, a glass substrate or a ceramic substrate may be used. A method of bonding the substrate 2 and the lid 5 to each other is not particularly limited, and may employ a method which is selected as appropriate depending on a material of the substrate 2 or the lid 5, and may employ, for example, anodic bonding, activation bonding in which bonding surfaces activated through plasma irradiation are bonded together, bonding using a bonding material such as glass frits, or diffusion bonding in which metal films formed on the upper surface of the substrate 2 and the lower surface of the lid 5 are bonded to each other. In the present embodiment, the substrate 2 and the lid 5 are bonded to each other via glass frits 59 (low melting point glass).

As illustrated in FIG. 1, the element section 3 includes a fixed support 31 fixed to the upper surface of the mount 22, a movable electrode 32 (movable portion or movable plate) which is displaceable with respect to the fixed support 31, and a beam 33 which connects the fixed support 31 to the movable electrode 32. In a case where the acceleration Az is applied to the physical quantity sensor 1, the movable electrode 32 torsionally deforms the beam 33 and is also seesaw-rotated (rotationally moved) about a rotation axis J with respect to the fixed support 31. The element section 3 is formed, for example, by patterning a conductive silicon substrate doped with an impurity such as phosphorus (P), boron (B), or arsenic (As) through etching.

The movable electrode 32 is longitudinally extended along the X axis direction. The movable electrode 32 includes a first movable electrode 321 (first mass part or first mass plate) which is located on the X axis direction negative side (one side) with respect to the rotation axis J, a second movable electrode 322 (second mass part or second mass plate) which is located on the X axis direction positive side (the other side) with respect to the rotation axis J, and a pair of links 323 and 324 connecting the first movable electrode 321 and the second movable electrode 322 to each other. The movable electrode 32 has an opening 325 surrounded by the first and second movable electrodes 321 and 322, and the links 323 and 324, and the fixed support 31 and the beam 33 are disposed in the opening 325. As mentioned above, the opening 325 is provided, and the fixed support 31 and the beam 33 are disposed therein, so that the element section 3 can be miniaturized.

Each corner of the opening 325 is filleted (rounded). Consequently, stress concentration is alleviated, and thus it is possible to effectively reduce damage (the occurrence of cracks) of the movable electrode 32. Thus, it is possible to provide the physical quantity sensor 1 having favorable mechanical strength. However, each corner of the opening 325 may be not rounded.

The second movable electrode 322 is longer than (has a greater mass than that of) the first movable electrode 321 in the X axis direction, and has a larger rotation moment than that of the first movable electrode 321 when the acceleration Az is applied. In a case where the acceleration Az is applied, the movable electrode 32 is seesaw-rotated about the rotation axis J due to a difference between the rotation moments.

The first movable electrode 321 is provided with a plurality of through-holes 321a which are arranged in a matrix. Similarly, the second movable electrode 322 is provided with a plurality of through-holes 322a which are arranged in a matrix. The through-holes 321a and 322a function as vents for reducing filling with reactive gases when a silicon substrate is dry etched, or vents for favorably seesaw-rotating the movable electrode 32 by adjusting air resistance when the movable electrode 32 is seesaw-rotated.

In the present embodiment, each of the through-holes 321a and 322a has a square opening shape, but an opening shape of each of the through-holes 321a and 322a is not particularly limited, and may be any shape, for example, a quadrangular shape other than a square shape, a circular shape, an elliptical shape, a triangular shape, a trapezoidal shape, or a parallelogram shape, a polygonal shape such as a pentagonal shape, or an irregular shape. An opening shape or a size of at least one of the through-holes 321a and 322a may be different from opening shapes or sizes of other through-holes 321a and 322a. The through-holes 321a and 322a may also be omitted.

The fixed support 31 includes a first fixed support 31a which is located on the X axis direction negative side (one side) of the rotation axis J, and a second fixed support 31b which is located on the X axis direction positive side (the other side) of the rotation axis J. The first and second fixed supports 31a and 31b are respectively bonded to the upper surface of the mounts 22. In the present embodiment, each corner of the fixed support 31 is filleted (rounded). Consequently, stress concentration on the fixed support 31 is alleviated, and thus it is possible to effectively reduce damage (the occurrence of cracks) of the fixed support 31. Thus, it is possible to provide the physical quantity sensor 1 having favorable mechanical strength. However, at least one corner of the fixed support 31 may be not rounded.

The beam 33 has a first beam 331 which is located on the Y axis direction positive side of the fixed support 31 and connects the fixed support 31 and the link 323 to each other, and a second beam 332 which is located on the Y axis direction negative side of the fixed support 31 and connects the fixed support 31 and the link 324 to each other. As mentioned above, since the fixed support 31 is connected to the movable electrode 32 via the first and second beams 331 and 332 disposed on both sides of the fixed support 31, the movable electrode 32 can be supported with good balance, and thus the seesaw-rotation of the movable electrode 32 is stable.

As illustrated in FIG. 3, the first beam 331 has a support beam 331a which is longitudinally extended along the rotation axis J (Y axis direction), and a branch 331b which is longitudinally extended along the X axis direction, and is connected to an end of the support beam 331a on the Y axis direction negative side at the center in the longitudinal direction. An end of the support beam 331a on the Y axis direction positive side is connected to the movable electrode 32 (link 323), an end of the branch 331b on the X axis direction positive side is connected to the second fixed support 31b, and an end of the support beam 331a on the X axis direction negative side is connected to the first fixed support 31a.

Similarly, the second beam 332 has a support beam 332a which is longitudinally extended along the rotation axis J (Y axis direction), and a branch 332b which is longitudinally extended along the X axis direction, and is connected to an end of the support beam 332a on the Y axis direction positive side at the center in the longitudinal direction. An end of the support beam 332a on the Y axis direction negative side is connected to the movable electrode 32 (link 324), an end of the branch 332b on the X axis direction positive side is connected to the second fixed support 31b, and an end of the support beam 332a on the X axis direction negative side is connected to the first fixed support 31a.

The support beams 331a and 332a are coaxial along the Y axis direction, and are aligned along the rotation axis J. Since the first and second beams 331 and 332 have the above configurations, stress caused by torsional deformation of the support beams 331a and 332a is alleviated due to deformation of the branches 331b and 332b before the stress is transferred to the fixed support 31, and thus it is possible to alleviate stress concentration on the connections between the first and second beams 331 and 332 and the fixed support 31. Thus, the mechanical strength of the element section 3 is improved, and thus it is possible to provide the physical quantity sensor 1 with high reliability.

Particularly, in the present embodiment, both ends of each of the branches 331b and 332b flare outwardly so that a width of each end gradually increases toward the fixed support 31. Thus, it is possible to more effectively alleviate stress concentration on the connections between the first and second beams 331 and 332 and the fixed support 31. Both ends of the support beams 331a and 332a flare outwardly so that the widths thereof respectively gradually increase toward the links 323 and 324 or the branches 331b and 332b. Thus, it is possible to more effectively alleviate stress concentration on the connections between the support beams 331a and 332a and the branches 331b and 332b or the connections between the support beams 331a and 332a and the links 323 and 324. However, the configurations of the first and second beams 331 and 332 are not particularly limited, and, for example, the ends thereof may not have flared shapes, or the branches 331b and 332b may be omitted.

Returning to description of the movable electrode 32, the links 323 and 324 of the movable electrode 32 will be described in detail. As illustrated in FIG. 3, the link 323 is located on the Y axis direction positive side with respect to the fixed support 31, and is connected to the fixed support 31 via the first beam 331. The link 323 is longitudinally extended along the X axis direction, an end thereof on the X axis direction negative side is connected to the first movable electrode 321, and an end thereof on the X axis direction positive side is connected to the second movable electrode 322. On the other hand, the link 324 is located on the Y axis direction negative side with respect to the fixed support 31, and is connected to the fixed support 31 via the second beam 332. The link 324 is longitudinally extended along the X axis direction, an end thereof on the X axis direction negative side is connected to the first movable electrode 321, and an end thereof on the X axis direction positive side is connected to the second movable electrode 322.

Each of the links 323 and 324 is provided with a first slit (opening) 341, a second slit (opening) 342, and a third slit (opening) 343 which are through-holes penetrating in a thickness direction. Since the configurations of the first, second, and third slits 341, 342, and 343 are the same for each of the links 323 and 324, hereinafter, for convenience, the first, second, and third slits 341, 342, and 343 formed in the link 323 will be described as a representative, and the first, second, and third slits 341, 342, and 343 formed in the link 324 will not be described.

As illustrated in FIG. 4, the first slit 341, which is longitudinally extended along the X axis direction, is disposed to intersect (cross) the rotation axis J (an extension line of the support beam 331a) in a plan view, and is disposed to be arranged with the first beam 331 in the Y axis direction. Since the first slit 341 is provided, a beam 326 which is longitudinally extended along the X axis direction and is connected to the first beam 331 at the center thereof in a longitudinal direction thereof is formed between the first beam 331 and the first slit 341. Stress caused by torsional deformation of the first beam 331 (support beam 331a) is alleviated due to deformation of the beam 326, and thus it is possible to alleviate stress concentration on the connection between the first beam 331 and the link 323. Thus, the mechanical strength of the element section 3 is improved, and thus it is possible to provide the physical quantity sensor 1 with high reliability.

Both ends of the first slit 341 have a tapered shape of which a width gradually decreases. Particularly, in the present embodiment, both ends of the first slit 341 are rounded in a circular arc shape. Consequently, hard corners are removed from the first slit 341, and thus stress concentration can be alleviated. Thus, it is possible to effectively reduce the occurrence of cracks triggered by the first slit 341.

However, a shape of the first slit 341 is not particularly limited. For example, the first slit 341 may have a rectangular shape having corners instead of both ends thereof being rounded, and may have a rectangular shape of which each corner is chamfered. Roundness is not limited to a circular arc shape of which a constant radius of curvature, and may be formed in a curved shape having portions of which curvature radii are different from each other. For example, the first slit 341 may be longitudinally extended along the Y axis direction, may have a shape of which a length in the X axis direction is the same as a length in the Y axis direction, such as a circular shape or a square shape.

The second slit 342 is longitudinally extended along the X axis direction, and is located on the X axis direction negative side with respect to the first slit 341 (rotation axis J). On the other hand, the third slit 343 is longitudinally extended along the X axis direction, and is located on the X axis direction positive side with respect to the first slit 341 (rotation axis J). In the present embodiment, the second slit 342 and the third slit 343 are disposed to be symmetric with respect to the rotation axis J.

Since the second and third slits 342 and 343 are disposed on both sides of the first slit 341, it is possible to alleviate stress concentration on the connection between the link 323 and the first beam 331 more than in a case where only the first slit 341 is formed. For example, since the second and third slits 342 and 343 which are not connected to the first slit 341 are disposed on both sides of the first slit 341 instead of forming a single large slit by connecting the first, second, and third slits 341, 342, and 343 to each other, a beam 328 is formed between the first slit 341 and the second slit 342, and a beam 329 is formed between the first slit 341 and the third slit 343. The link 323 is reinforced by the beams 328 and 329, and thus it is possible to reduce an excessive rigidity of the link 323.

Both ends of the second slit 342 have a tapered shape of which a width gradually decreases. Particularly, in the present embodiment, both ends of the second slit 342 are rounded in a circular arc shape. Consequently, hard corners are removed from the second slit 342, and thus stress concentration can be alleviated. Thus, it is possible to effectively reduce the occurrence of cracks triggered by the second slit 342.

Similarly, both ends of the third slit 343 have a tapered shape of which a width gradually decreases. Particularly, in the present embodiment, both ends of the third slit 343 are rounded in a circular arc shape. Consequently, hard corners are removed from the third slit 343, and thus stress concentration can be alleviated. Thus, it is possible to effectively reduce the occurrence of cracks triggered by the third slit 343.

Particularly, in the present embodiment, each of the second and third slits 342 and 343 has the same shape and size as that of the first slit 341. In other words, there is a relationship of W1=W2=W3 and L1=L2=L3. Consequently, the first, second, and third slits 341, 342, and 343 are easily formed.

However, a shape of each of the second and third slits 342 and 343 is not particularly limited, and, for example, the each of the second and third slits 342 and 343 may have a rectangular shape having corners instead of both ends thereof being rounded, and may have a rectangular shape of which each corner is chamfered. Roundness is not limited to a circular arc shape of which a constant radius of curvature, and may be formed in a curved shape having portions of which curvature radii are different from each other. For example, each of the second and third slits 342 and 343 may be longitudinally extended along the Y axis direction, may have a shape of which a length in the X axis direction is the same as a length in the Y axis direction, such as a circular shape or a square shape. Each of the second and third slits 342 and 343 may have a shape or a size which is different from that of the first slit 341. In other words, there may be a relationship of L1>L2 or L3, and a relationship of L1<L2 or L3. There may be a relationship of W1>W2 or W3, and a relationship of W1<W2 or W3. In the present embodiment, the lengths L2 and L3 are the same as each other, but are not limited thereto, and may have a relationship of L2>L3 or L2<L3. Similarly, in the present embodiment, the widths W2 and W3 are the same as each other, but are not limited thereto, and may have a relationship of W2>W3 or W2<W3.

In a case where, in a plan view from the Z axis direction, an axis along the X axis direction through the center (the center in the width direction) of the first slit 341 is referred to as a first central axis Jx1 (major axis Jx1), an axis along the X axis direction through the center (the center in the width direction) of the second slit 342 is referred to as a second central axis Jx2 (major axis Jx2), and an axis along the X axis direction through the center (the center in the width direction) of the third slit 343 is referred to as a third central axis Jx3 (major axis Jx3), each of the second central axis Jx2 and the third central axis Jx3 is deviated (laterally offset) toward the Y axis direction positive side (an opposite side to the fixed support 31) with respect to the first central axis Jx1. Consequently, facing ends of the first slit 341 and the second slit 342 can be prevented from directly facing each other across the shortest distance, and thus it is possible to effectively reduce the occurrence of cracks in the beam 328 located therebetween. Similarly, facing ends of the first slit 341 and the third slit 343 can be prevented from directly facing each other across the shortest distance, and thus it is possible to effectively reduce the occurrence of cracks in the beam 329 located therebetween. Thus, the mechanical strength of the link 323 is further improved.

Particularly, in the present embodiment, the second slit 342 has a region overlapping a region (band) Qx extending lengthwise from the first slit 341 in the X axis direction. In other words, a separation distance D3 between the first central axis Jx1 and the second central axis Jx2 is smaller than a width W1 of the first slit 341 (D3<W1). Similarly, the third slit 343 has a region overlapping the region Qx. In other words, a separation distance D4 between the first central axis Jx1 and the third central axis Jx3 is smaller than the width W1 of the first slit 341 (D4<W1). Consequently, the second and third slits 342 and 343 can be disposed to be closer to the connection between the first beam 331 and the link 323, and thus it is possible to more effectively alleviate stress concentration on the connection portion between the first beam 331 and the link 323.

The second slit 342 is disposed not to exceed (cross) a boundary I1 between the link 323 and the first movable electrode 321. In other words, the entire second slit 342 is located in the link 323. The boundary I1 is a portion to which stress is relatively easily applied during seesaw-rotation of the movable electrode 32. Thus, since the second slit 342 is formed not to exceed the boundary I1, it is possible to reduce a mechanical strength reduction of the boundary I1, and thus to effectively reduce the occurrence of cracks or the like near the boundary I1.

Similarly, the third slit 343 is disposed not to exceed (cross) a boundary I2 between the link 323 and the second movable electrode 322. In other words, the entire third slit 343 is located in the link 323. The boundary I2 is a portion to which stress is relatively easily applied during seesaw-rotation of the movable electrode 32. Thus, since the third slit 343 is formed not to exceed the boundary I2, it is possible to reduce a mechanical strength reduction of the boundary I2, and thus to effectively reduce the occurrence of cracks or the like near the boundary I2.

However, the second slit 342 may be formed to exceed the boundary I1, and the third slit 343 may be formed to exceed the boundary I2. In other words, a part of the second slit 342 may be located in the first movable electrode 321, and a part of the third slit 343 may be located in the second movable electrode 322.

As mentioned above, the element section 3 has been described. Here, returning to description of the electrodes 8, in a plan view from the Z axis direction, the first fixed electrode 81 is disposed to face the first movable electrode 321, and the second fixed electrode 82 and the dummy electrode 83 are disposed to face the second movable electrode 322. During driving of the physical quantity sensor 1, for example, a voltage V1 in FIG. 5 is applied to the element section 3, and each of the first fixed electrode 81 and the second fixed electrode 82 is connected to a QV amplifier (charge-voltage conversion circuit). An electrostatic capacitor C1 is formed between the first fixed electrode 81 and the first movable electrode 321, and an electrostatic capacitor C2 is formed between the second fixed electrode 82 and the second movable electrode 322.

In a case where the acceleration Az in the Z axis direction is applied to the physical quantity sensor 1, the movable electrode 32 torsionally deforms the beam 33 due to a difference between rotation moments of the first and second movable electrodes 321 and 322 so as to be seesaw-rotated about the rotation axis J, and thus capacitances of the electrostatic capacitors C1 and C2 are changed. Thus, it is possible to measure the acceleration Az on the basis of the changes of the capacitances of the electrostatic capacitors C1 and C2. In a case where the capacitance of the electrostatic capacitor C1 increases, the capacitance of the electrostatic capacitor C2 decreases, and, conversely, in a case where the capacitance of the electrostatic capacitor C1 decreases, the capacitance of the electrostatic capacitor C2 increases. Thus, noise can be canceled through a differential operation (subtraction process: C1-C2) between a detection signal (a signal corresponding to the magnitude of the capacitance of the electrostatic capacitor C1) obtained from the first fixed electrode 81 and a detection signal (a signal corresponding to the magnitude of the capacitance of the electrostatic capacitor C2) obtained from the second fixed electrode 82, and thus it is possible to measure the acceleration Az with higher accuracy.

As mentioned above, the physical quantity sensor 1 has been described. As described above, the physical quantity sensor 1 includes the substrate 2, and the element section 3 supported at the substrate 2. The element section 3 includes the fixed support 31 attached to the substrate 2, the movable electrode 32 (movable portion), and the support beams 331a and 332a connecting the fixed support 31 to the movable electrode 32. The movable electrode 32 is displaceable with the support beams 331a and 332a as the rotation axis J. The movable electrode 32 includes the first movable electrode 321 (first mass part) located on one side of the X axis direction (a first direction orthogonal to the rotation axis J) via the rotation axis J, the second movable electrode 322

(second mass part) located on the other side of the X axis direction, and the links 323 and 324 which are connected to the support beams 331a and 332a and connect the first movable electrode 321 to the second movable electrode 322. Each of the links 323 and 324 includes the first slit 341, the second slit 342 located on the first movable electrode 321 side of the first slit 341, and the third slit 343 located on the second movable electrode 322 side of the first slit 341. In a case where an axis along the X axis direction through the center of the first slit 341 in a plan view is referred to as a first central axis Jx1, an axis along the X axis direction through the center of the second slit 342 in a plan view is referred to as a second central axis Jx2, and an axis along the X axis direction through the center of the third slit 343 in a plan view is referred to as a third central axis Jx3, each of the second central axis Jx2 and the third central axis Jx3 is deviated in a direction (Y axis direction) of the rotation axis J with respect to the first central axis Jx1. As mentioned above, the first slit 341, the second slit 342, and the third slit 343 are disposed in the links 323 and 324, and thus it is possible to more effectively alleviate stress concentration on the connection between the first beam 331 and the link 323. Thus, it is possible to provide the physical quantity sensor 1 having favorable mechanical strength.

As described above, the first slit 341 is longitudinally extended along the X axis direction. Consequently, the first slit 341 can be formed to be larger in a connection region between the first beam 331 and the link 323. Thus, it is possible to more effectively alleviate stress concentration on the connection portion between the first beam 331 and the link 323. A shape of the first slit 341 is not limited to a longitudinally extended shape, and may be any shape.

As described above, both ends of the first slit 341 in the X axis direction are rounded. Consequently, it is possible to alleviate stress concentration on the first slit 341.

As described above, each of the second slit 342 and the third slit 343 is longitudinally extended along the X axis direction. Consequently, each of the second slit 342 and the third slit 343 can be formed to be larger around the first slit 341. Thus, it is possible to more effectively alleviate stress concentration on the connection portion between the first beam 331 and the link 323. A shape of each of the second slit 342 and the third slit 343 is not limited to a longitudinally extended shape, and may be any shape.

As described above, both ends of the second slit 342 in the X axis direction are rounded, and both ends of the third slit 343 in the X axis direction are rounded. Consequently, it is possible to alleviate stress concentration on the second slit 342 and the third slit 343.

As described above, each of the second slit 342 and the third slit 343 has a region overlapping the region Qx to which the first slit 341 extends in the X axis direction. Consequently, the second and third slits 342 and 343 can be disposed to be closer to the connection between the first beam 331 and the link 323, and thus it is possible to more effectively alleviate stress concentration on the connection between the first beam 331 and the link 323.

As described above, the physical quantity sensor 1 is a sensor which can measure acceleration Az. Consequently, the physical quantity sensor 1 with high convenience is provided.

Second Embodiment

Next, a description will be made of a physical quantity sensor according to a second embodiment.

Figure 6:
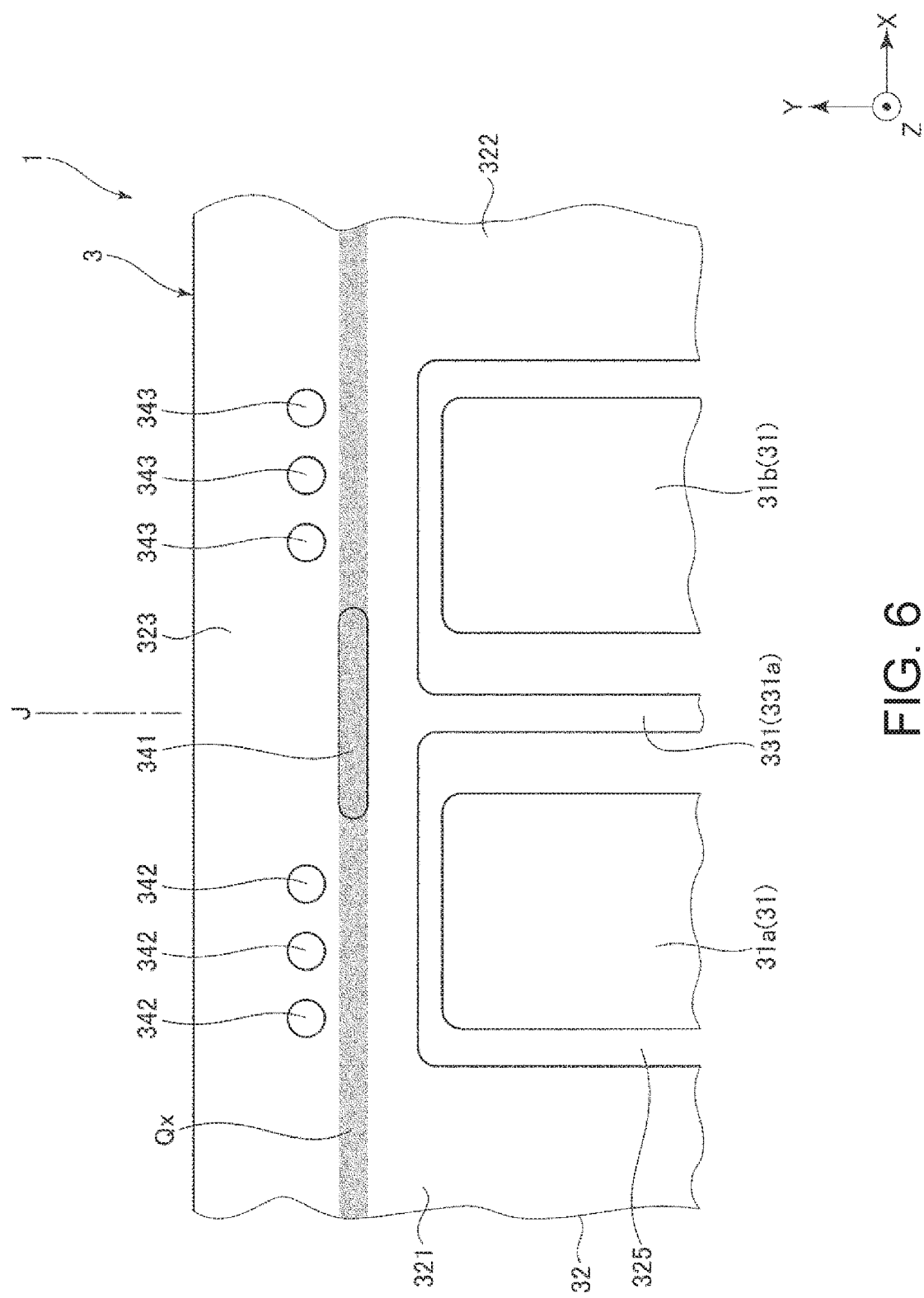
FIG. 6 is a partially enlarged plan view of an element section of a physical quantity sensor according to a second embodiment.
Figure 7:
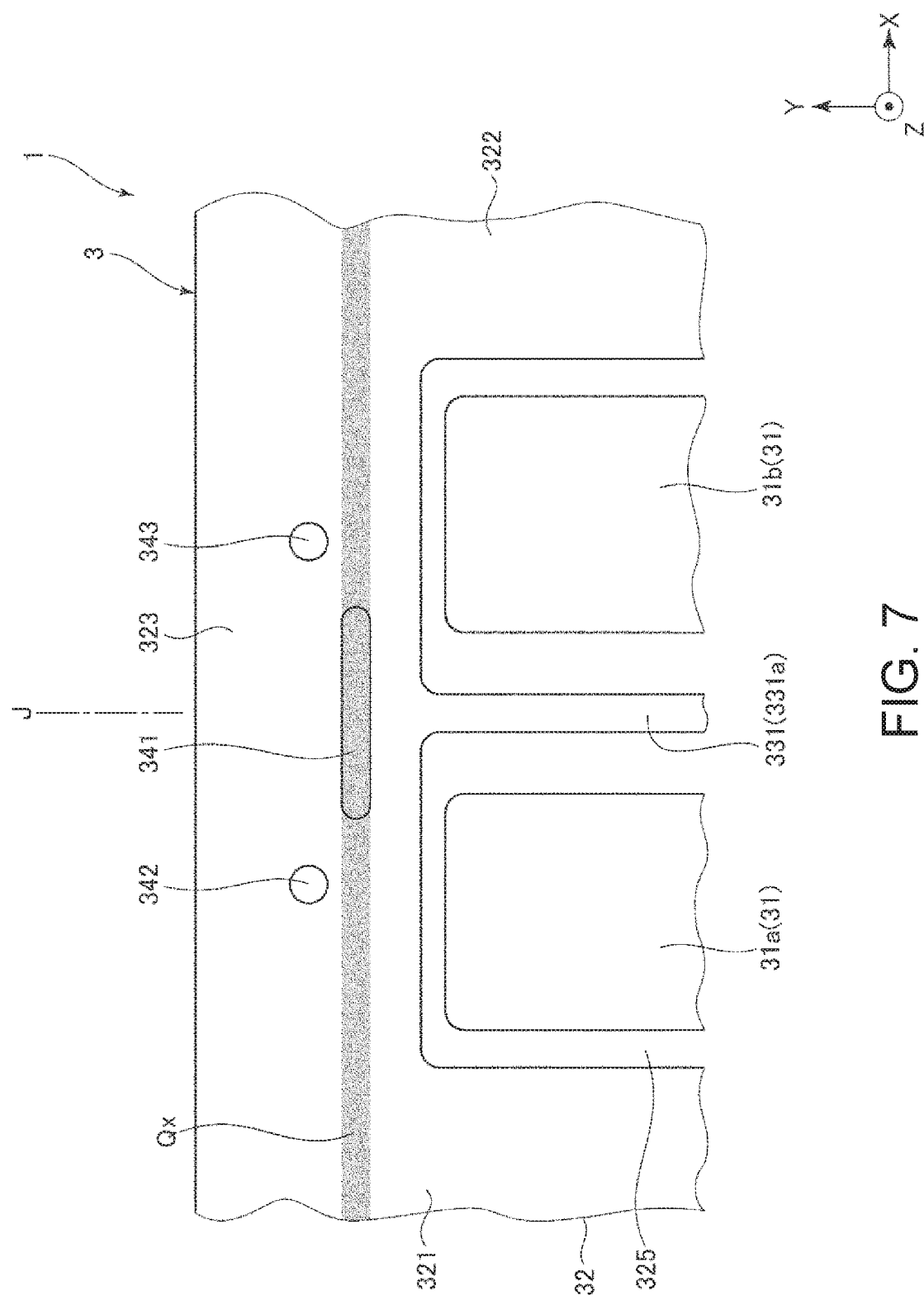
FIG. 7 is a partially enlarged plan view illustrating a modification example of the element section illustrated in FIG. 6.

FIG. 6 is a partially enlarged plan view of an element section of a physical quantity sensor according to the second embodiment. FIG. 7 is a partially enlarged plan view illustrating a modification example of the element section illustrated in FIG. 6.

A physical quantity sensor 1 according to the present embodiment is the same as the physical quantity sensor 1 of the first embodiment except for a difference in a configuration of the links 323 and 324. In the following description, regarding the physical quantity sensor 1 of the second embodiment, differences from the first embodiment will be discussed, and a description of the same contents will be omitted. In FIGS. 6 and 7, the same constituent elements as those in the first embodiment are given the same reference numerals. Since the configurations of the two links 323 and 324 are the same as each other, hereinafter, for convenience of description, the link 323 will be described as a representative, and the link 324 will not be described.

As illustrated in FIG. 6, in the link 323 of the present embodiment, each of the second slit (opening) 342 and the third slit (opening) 343 takes the form of a plurality of openings (through holes) disposed along the X axis direction. Each of the second openings 342 and the third openings 343 has a substantially circular shape. In other words, neither of the second openings 342 and the third openings 343 is longitudinally extended along the X axis direction as in the first embodiment, but rather has a length in the X axis direction that is substantially the same as a length in the Y axis direction. Each of the second openings 342 and the third openings 343 is deviated relative to a region Qx to which the first slit 341 extends in the X axis direction, that is, disposed not to overlap the region Qx.

As mentioned above, in the physical quantity sensor 1 of the present embodiment, a plurality of the second openings 342 and a plurality of the third openings 343 are disposed along the X axis direction. Consequently, for example, by changing the number of second openings 342 and third openings 343, it is possible to adjust the rigidity of the connection between the first beam 331 and the link 323 and thus to effectively reduce stress concentration on the connection between the first beam 331 and the link 323.

In the present embodiment, three second openings and three third openings 342 and 343 are disposed along the X axis direction, but the number of second and third openings 342 and 343 is not particularly limited, and may be two, and may be four or more. The number of second openings 342 and the number of third openings 343 may be the same as or different from each other.

According to the second embodiment, it is also possible to exhibit the same effects as in the first embodiment. As a modification example of the present embodiment, as illustrated in FIG. 7, a single second opening 342 and a single third opening 343 are provided.

Third Embodiment

Next, a physical quantity sensor according to a third embodiment will be described.

Figure 8:
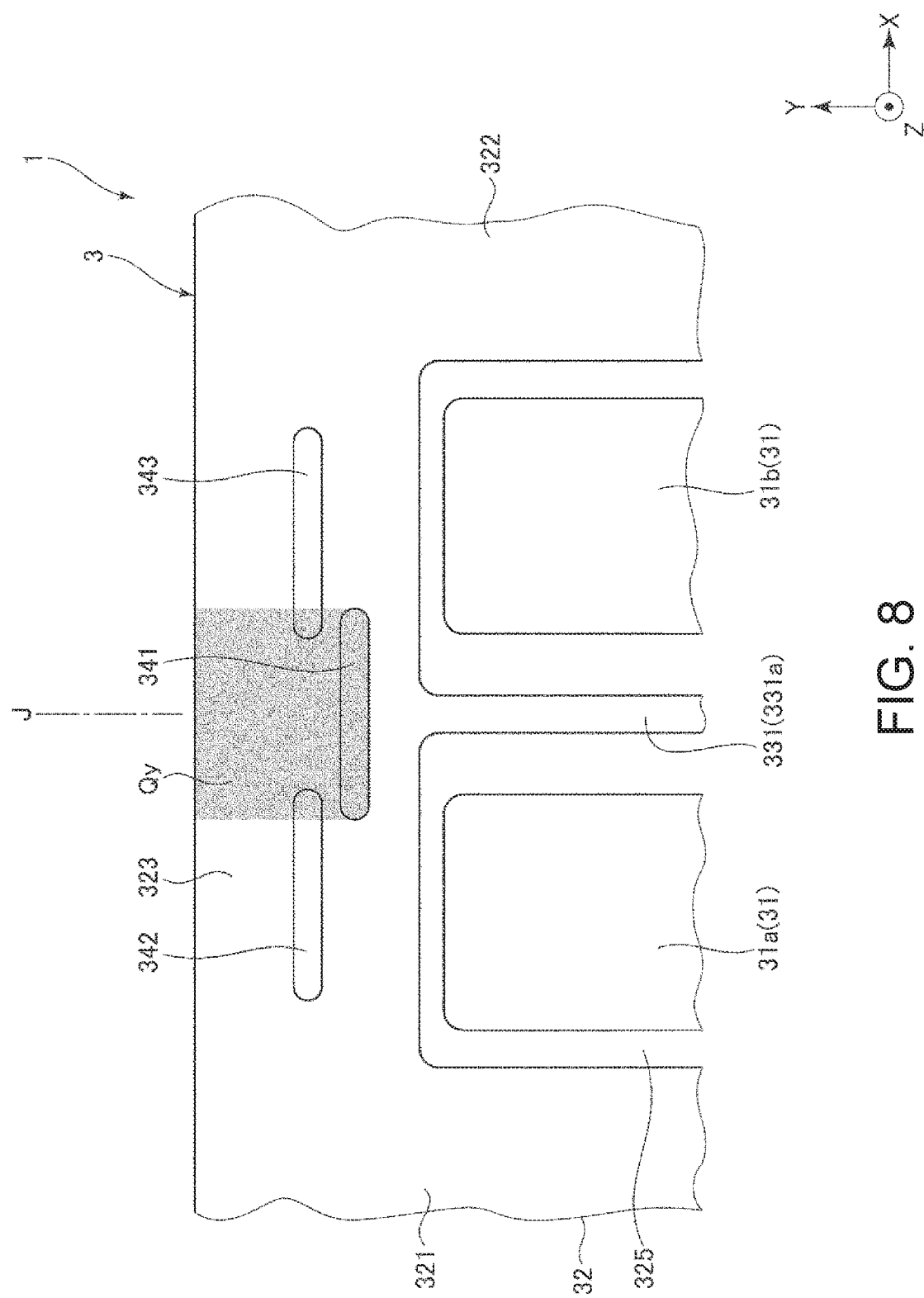
FIG. 8 is a partially enlarged plan view of an element section of a physical quantity sensor according to a third embodiment.

FIG. 8 is a partially enlarged plan view of an element section of a physical quantity sensor according to the third embodiment.

A physical quantity sensor 1 according to the present embodiment is the same as the physical quantity sensor 1 of the first embodiment except for a difference in a configuration of the links 323 and 324. In the following description, regarding the physical quantity sensor 1 of the third embodiment, differences from the first embodiment will be discussed, and a description of the same contents will be omitted. In FIG. 8, the same constituent elements as those in the first embodiment are given the same reference numerals. Since the configurations of the links 323 and 324 are the same as each other, hereinafter, for convenience of description, the link 323 will be described as a representative, and the link 324 will not be described.

As illustrated in FIG. 8, in the link 323 of the present embodiment, each of the second slit 342 and the third slit 343 is deviated relative to a region Qx to which the first slit 341 extends in the X axis direction, that is, disposed not to overlap the region Qx. An end of the second slit 342 on the X axis direction positive side is disposed to be juxtaposed with an end of the first slit 341 on the X axis direction negative side in the Y axis direction. Similarly, an end of the third slit 343 on the X axis direction negative side is disposed to be juxtaposed with an end of the first slit 341 on the X axis direction positive side in the Y axis direction. Each of the second and third slits 342 and 343 has a region overlapping a band region Qy extending transversely from the first slit 341 in a direction (Y axis direction) along the rotation axis J. Consequently, the second and third slits 342 and 343 can be disposed to be closer to the connection between the first beam 331 and the link 323, and thus it is possible to more effectively alleviate stress concentration on the connection portion between the first beam 331 and the link 323.

According to the third embodiment, it is also possible to exhibit the same effects as in the first embodiment.

Fourth Embodiment

Next, a description will be made of a physical quantity sensor according to a fourth embodiment.

Figure 9:
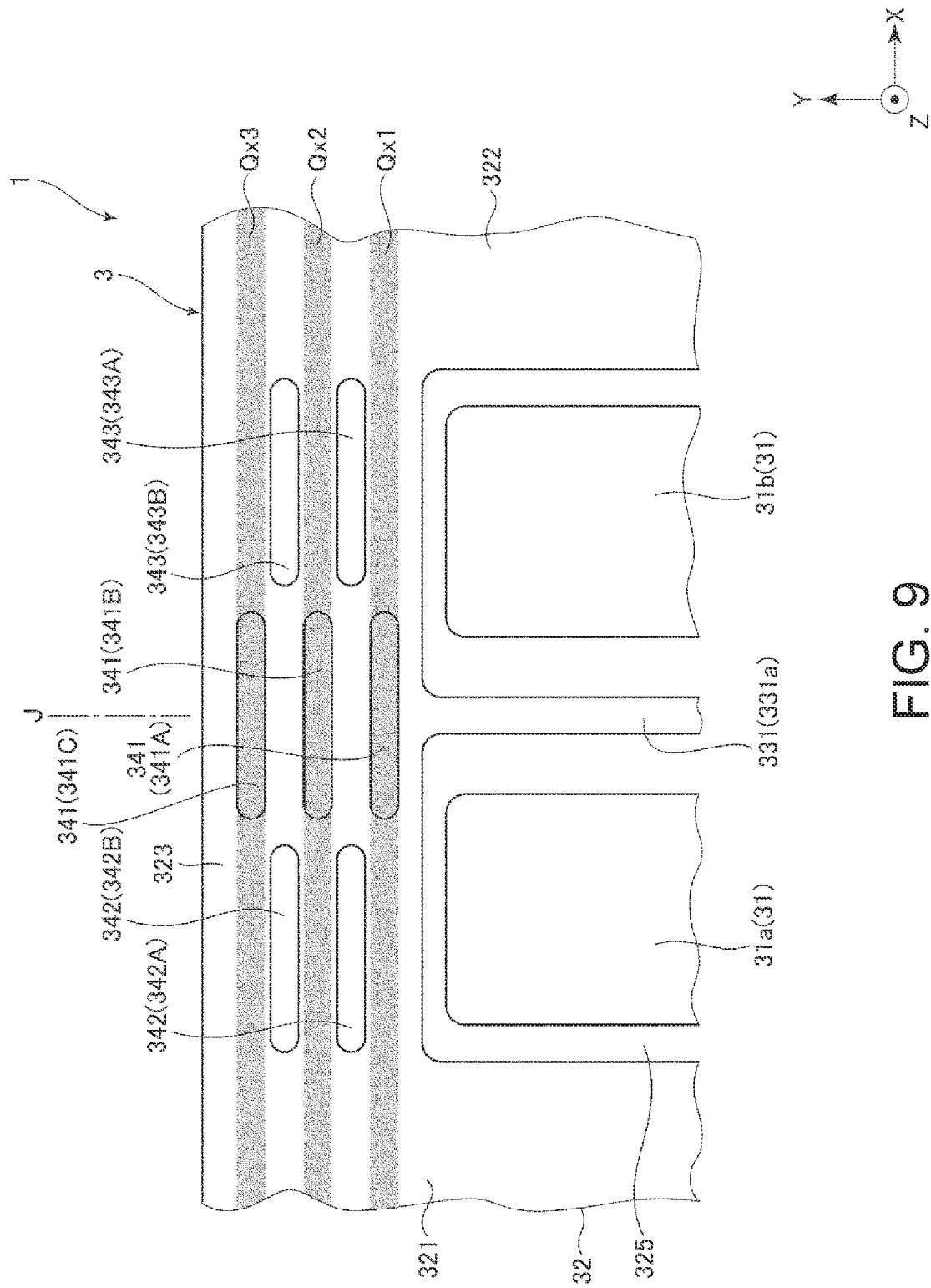
FIG. 9 is a partially enlarged plan view of an element section of a physical quantity sensor according to a fourth embodiment.
Figure 10:
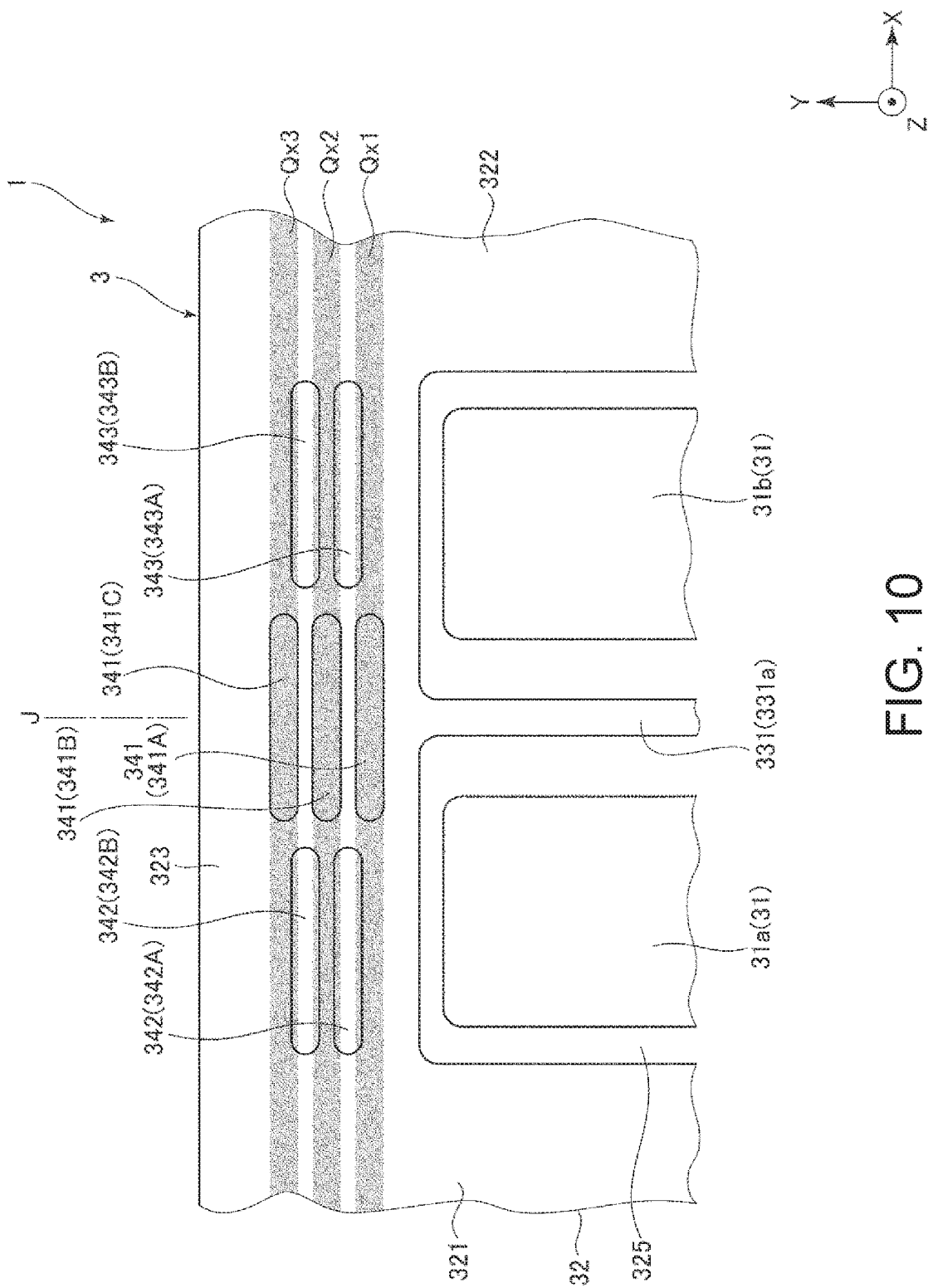
FIG. 10 is a partially enlarged plan view illustrating a modification example of the element section illustrated in FIG. 9.

FIG. 9 is a partially enlarged plan view of an element section of a physical quantity sensor according to the fourth embodiment. FIG. 10 is a partially enlarged plan view illustrating a modification example of the element section illustrated in FIG. 9.

A physical quantity sensor 1 according to the present embodiment is the same as the physical quantity sensor 1 of the first embodiment except for a difference in a configuration of the links 323 and 324. In the following description, regarding the physical quantity sensor 1 of the fourth embodiment, differences from the first embodiment will be discussed, and a description of the same contents will be omitted. In FIGS. 9 and 10, the same constituent elements as those in the first embodiment are given the same reference numerals. Since the configurations of the links 323 and 324 are the same as each other, hereinafter, for convenience of description, the link 323 will be described as a representative, and the link 324 will not be described.

As illustrated in FIG. 9, in the link 323 of the present embodiment, a plurality of first slits 341, second slits 342, and third slits 343 are disposed along the X axis direction. Specifically, three first slits 341 are disposed along the Y axis direction, two second slits 342 are disposed along the Y axis direction, and two third slits 343 are disposed along the Y axis direction. Thus, it is possible to effectively reduce stress concentration on the connection between the first beam 331 and the link 323. For example, as the number of slits is increased, a size of each slit can be reduced, and thus it is possible to effectively reduce the possibility that the rigidity of the link 323 becomes insufficient due to excessive lightening.

The number of first slits 341 is not particularly limited, and may be two, and may be four or more. The plurality of first slits 341 may have the same shape, and at least one first slit may have a shape which is different from those of other first slits. The number of second and third slits 342 and 343 is not particularly limited, and may be three or more. The plurality of second slits 342 may have the same shape, and at least one second slit may have a shape which is different from those of other second slits. Similarly, the plurality of third slits 343 may have the same shape, and at least one third slit may have a shape which is different from those of other third slits.

In a case where a region to which a first slit 341A located on the first beam 331 side extends in the X axis direction is referred to as a region Qx1, a region to which a first slit 341C located on an opposite side thereto extends in the X axis direction is referred to as a region Qx3, and a region to which a first slit 341B located at the center extends in the X axis direction is referred to as a region Qx2, second and third slits 342A and 343A on one side are located between the regions Qx1 and Qx2 so as not to overlap the regions Qx1 and Qx2, and second and third slits 342B and 343B on the other side are located between the regions Qx2 and Qx3 so as not to overlap the regions Qx2 and Qx3. Consequently, the first slits 341, the second slits 342, and the third slits 343 can be distributed to and disposed in the connection region between the first beam 331 and the link 323 without being excessively densely gathered. Consequently, it is possible to ensure that the rigidity of the link 323 is sufficient and also to more effectively alleviate stress concentration on the connection between the first beam 331 and the link 323.

As mentioned above, in the physical quantity sensor 1 of the present embodiment, a plurality of the first slits 341 are disposed along a direction (Y axis direction) along the rotation axis J. A plurality of the second slits 342 and a plurality of the third slits 343 are disposed along a direction parallel to the rotation axis J. Thus, it is possible to more effectively alleviate stress concentration on the connection between the first beam 331 and the link 323. For example, as the number of slits is increased, a size of each slit can be reduced, and thus it is possible to effectively reduce the possibility that the rigidity of the link 323 is insufficient due to excessive lightening.

According to the fourth embodiment, it is also possible to exhibit the same effects as in the first embodiment. As a modification example of the present embodiment, as illustrated in FIG. 10, each of the second and third slits 342 and 343 on one side may have a region which partially overlaps the regions Qx1 and Qx2, and each of the second and third slits 342 and 343 on the other side may have a region which partially overlaps the regions Qx2 and Qx3.

Fifth Embodiment

Next, a description will be made of a physical quantity sensor device according to a fifth embodiment.

Figure 11:
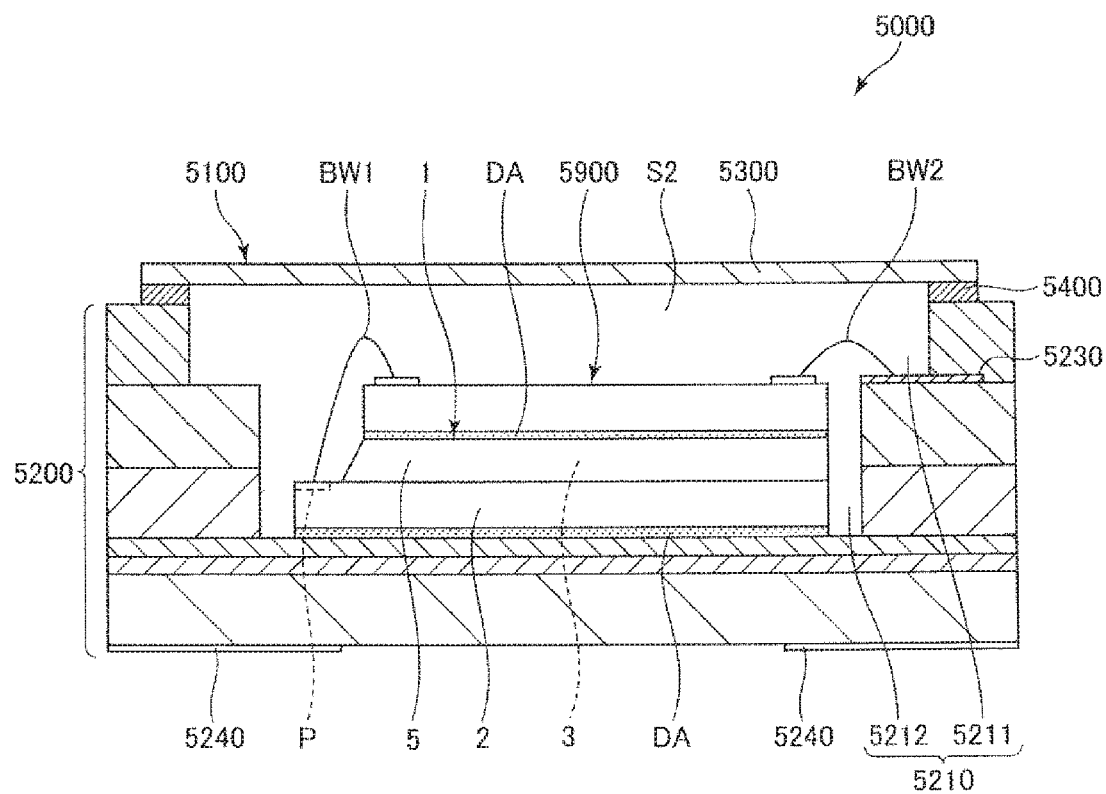
FIG. 11 is a sectional view illustrating a physical quantity sensor device according to a fifth embodiment.

FIG. 11 is a sectional view illustrating a physical quantity sensor device according to the fifth embodiment.

As illustrated in FIG. 11, a physical quantity sensor device 5000 includes the physical quantity sensor 1, a semiconductor element 5900 (circuit element), and a package 5100 housing the physical quantity sensor 1 and the semiconductor element 5900. As the physical quantity sensor 1, any physical quantity sensor of the above-described embodiments may be used.

The package 5100 includes a cavity-like base 5200, and a lid 5300 bonded to an upper surface of the base 5200. The base 5200 has a depression 5210 which is open to the upper surface. The depression 5210 includes a first depression 5211 which is open to the upper surface of the base 5200 and a second depression 5212 which is open to a bottom surface of the first depressed part 5211.

On the other hand, the lid 5300 has a tabular shape, and is bonded to the upper surface of the base 5200 so as to close the opening of the depression 5210. As mentioned above, the opening of the depression 5210 is closed by the lid 5300, so that a storage space S2 is formed in the package 5100, and the physical quantity sensor 1 and the semiconductor element 5900 are accommodated in the storage space S2. A method of bonding the base 5200 to the lid 5300 is not particularly limited, and, in the present embodiment, seam welding using a seam ring 5400 is used.

The storage space S2 is air-tightly sealed. An atmosphere of the storage space S2 is not particularly limited, and is preferably the same as, for example, an atmosphere of the storage space S of the physical quantity sensor 1. Consequently, even if the airtightness of the storage space S is broken, and thus the storage spaces S and S2 communicate with each other, the atmosphere of the storage space S can be maintained without any change. Thus, it is possible to reduce a change in a measurement characteristic of the physical quantity sensor 1 due to a change in the atmosphere of the storage space S, and thus to exhibit a stable measurement characteristic.

A constituent material of the base 5200 is not particularly limited, and various ceramics such as alumina, zirconia, or titania may be used. A constituent material of the lid 5300 is not particularly limited, and a member having a linear expansion coefficient similar to that of a constituent material of the base 5200 may be used. For example, in a case where the above-described ceramic is used as a constituent material of the base 5200, an alloy such as Kovar is preferably used.

The base 5200 includes a plurality of internal terminals 5230 disposed in the storage space S2 (a bottom surface of the first depressed part 5211) and a plurality of external terminals 5240 disposed on a bottom surface thereof. Each internal terminal 5230 is electrically connected to a predetermined external terminal 5240 via an internal wire (not illustrated) disposed in the base 5200.

The physical quantity sensor 1 is fixed to the bottom surface of the depression 5210 via a die attach material DA, and the semiconductor element 5900 is disposed on the upper surface of the physical quantity sensor 1 via the die attach material DA. The physical quantity sensor 1 is electrically connected to the semiconductor element 5900 via a bonding wire BW1, and the semiconductor element 5900 is electrically connected to the internal terminals 5230 via a bonding wire BW2.

The semiconductor element 5900 includes, as necessary, for example, a drive circuit which applies a drive voltage to the physical quantity sensor 1, a measurement circuit which measures the acceleration Az on the basis of an output from the physical quantity sensor 1, and an output circuit which converts a signal from the measurement circuit into a predetermined signal which is then output.

As mentioned above, the physical quantity sensor device 5000 has been described. The physical quantity sensor device 5000 includes the physical quantity sensor 1 and the semiconductor element 5900 (circuit element). Thus, it is possible to achieve the effect of the physical quantity sensor 1, and thus to provide the physical quantity sensor device 5000 with high reliability.

Sixth Embodiment

Next, a description will be made of a composite sensor device according to a sixth embodiment.

Figure 12:
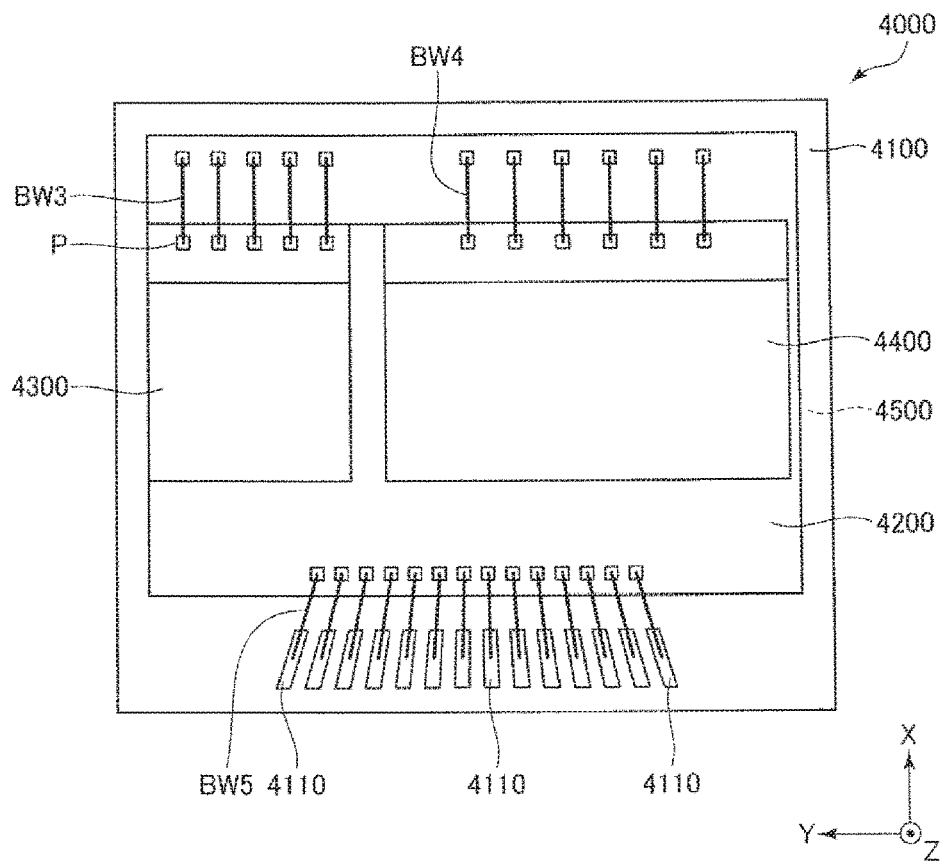
FIG. 12 is a plan view illustrating a composite sensor device according to a sixth embodiment.
Figure 13:
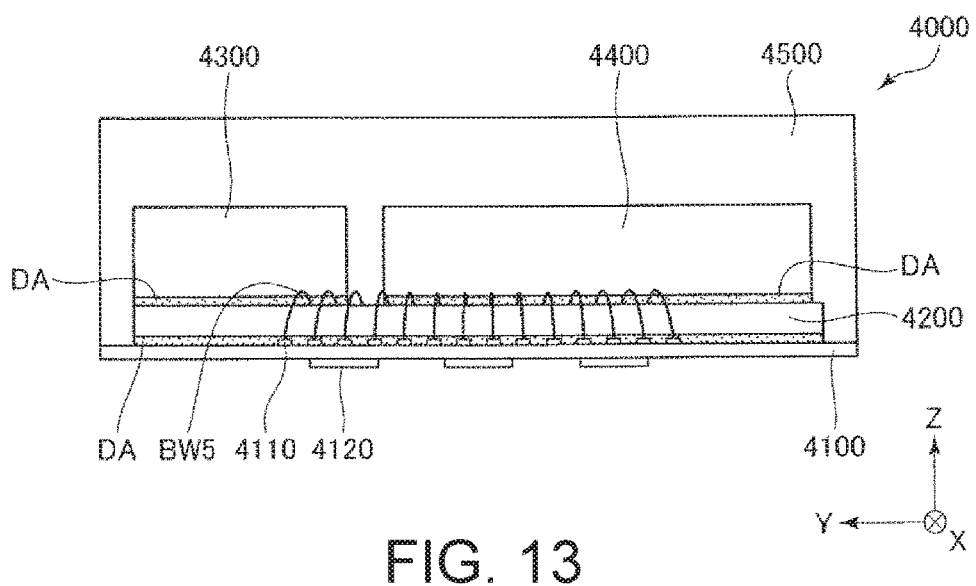
FIG. 13 is a sectional view of the composite sensor device illustrated in FIG. 12.

FIG. 12 is a plan view illustrating a composite sensor device according to the sixth embodiment. FIG. 13 is a sectional view of the composite sensor device illustrated in FIG. 12.

As illustrated in FIGS. 12 and 13, a composite sensor device 4000 includes a base substrate 4100, a semiconductor element 4200 (circuit element) attached to an upper surface of the base substrate 4100 via a die attach material DA (resin adhesive), an acceleration sensor 4300 (first physical quantity sensor) and an angular velocity sensor 4400 (second physical quantity sensor) attached to an upper surface of the semiconductor element 4200 via a die attach material, and a resin package 4500 covering the semiconductor element 4200, the acceleration sensor 4300, and the angular velocity sensor 4400. The acceleration sensor 4300 is a three-axis acceleration sensor which can separately measure accelerations in three axes (the X axis, the Y axis, and the Z axis) orthogonal to each other. The angular velocity sensor 4400 is a three-axis angular velocity sensor which can separately measure angular velocities in three axes (the X axis, the Y axis, and the Z axis) orthogonal to each other. The physical quantity sensor of the present embodiment may be used as the acceleration sensor 4300 and the angular velocity sensor 4400.

The base substrate 4100 is provided with a plurality of connection terminals 4110 on an upper surface thereof, and is provided with a plurality of external terminals 4120 on a lower surface thereof. Each connection terminal 4110 is electrically connected to a corresponding external terminal 4120 via an internal wire or the like (not illustrated) disposed in the base substrate 4100. The semiconductor element 4200 is disposed on the upper surface of the base substrate 4100.

The semiconductor element 4200 includes, as necessary, for example, a drive circuit which drives the acceleration sensor 4300 and the angular velocity sensor 4400, an acceleration measurement circuit which separately measures an acceleration in the X axis direction, an acceleration in the Y axis direction, and an acceleration in the Z axis direction on the basis of outputs from the acceleration sensor 4300, an angular velocity measurement circuit which separately measures an angular velocity about the X axis, an angular velocity about the Y axis, and an angular velocity about the Z axis on the basis of outputs from the angular velocity sensor 4400, and an output circuit which converts a signal from each of the acceleration measurement circuit and the angular velocity measurement circuit into a predetermined signal which is then output.

The semiconductor element 4200 is electrically connected to the acceleration sensor 4300 via bonding wires BW3, electrically connected to the angular velocity sensor 4400 via bonding wires BW4, and electrically connected to the connection terminals 4110 of the base substrate 4100 via bonding wires BW5. The acceleration sensor 4300 and the angular velocity sensor 4400 are disposed side by side on the upper surface of the semiconductor element 4200.

As mentioned above, the composite sensor device 4000 has been described. As described above, the composite sensor device 4000 includes the acceleration sensor 4300 (first physical quantity sensor), and the angular velocity sensor 4400 (second physical quantity sensor) which measures a physical quantity which is different from that of the acceleration sensor 4300. Consequently, it is possible to provide the composite sensor device 4000 which can measure different kinds of physical quantities and thus has high convenience. Particularly, in the present embodiment, the first physical quantity sensor is the acceleration sensor 4300 which measures accelerations, and the second physical quantity sensor is the angular velocity sensor 4400 which measures angular velocities. Thus, for example, it is possible to provide the composite sensor device 4000 which may be used for a motion sensor and thus has considerably high convenience.

Disposition of the acceleration sensor 4300 and the angular velocity sensor 4400 is not particularly limited, and, for example, the acceleration sensor 4300 and the angular velocity sensor 4400 may be attached to the upper surface of the base substrate 4100 with the semiconductor element 4200 interposed therebetween. With this configuration, it is possible to reduce a height of the composite sensor device 4000.

Seventh Embodiment

Next, a description will be made of an inertial measurement unit according to a seventh embodiment.

Figure 14:
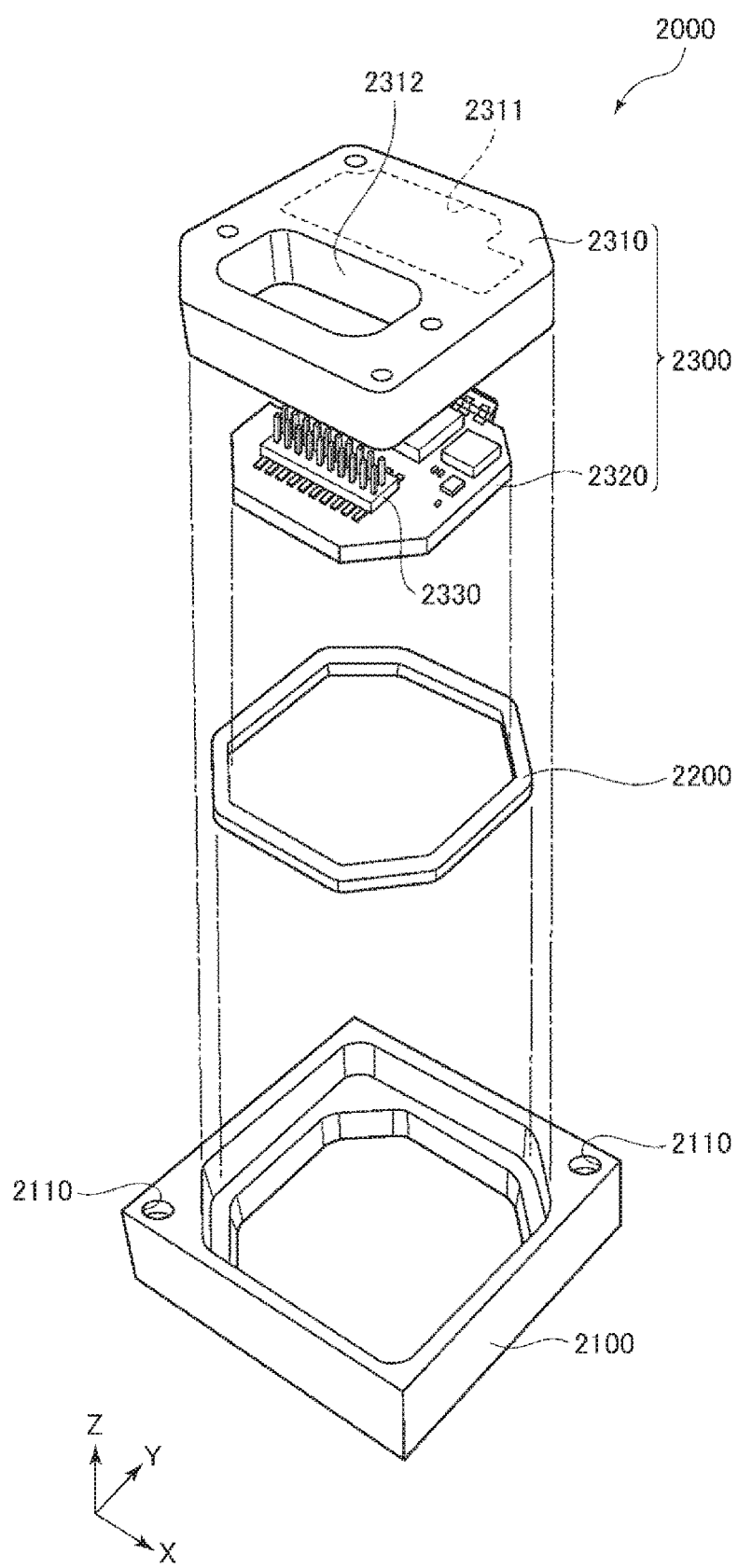
FIG. 14 is an exploded perspective view illustrating an inertial measurement unit according to a seventh embodiment.
Figure 15:
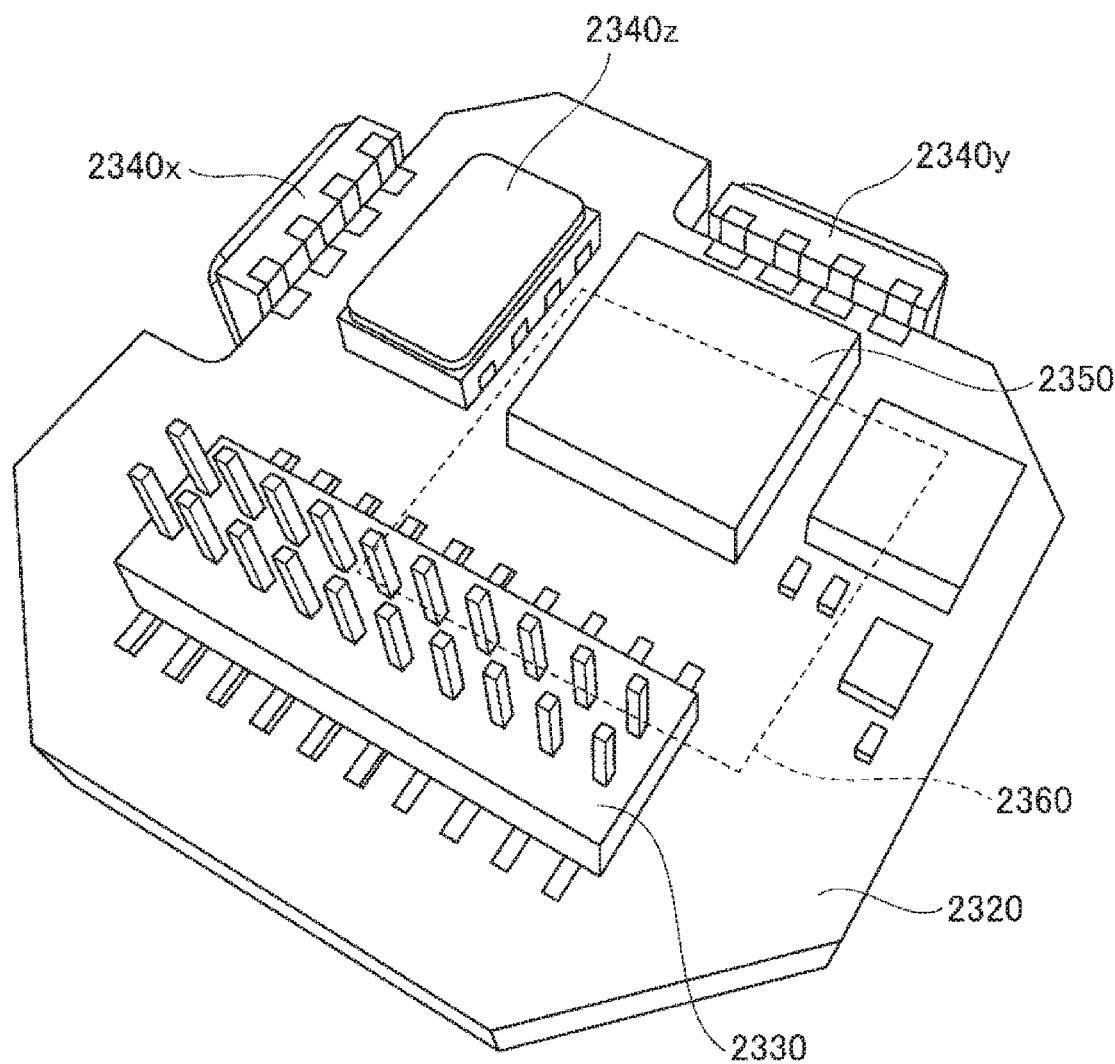
FIG. 15 is a perspective view of a substrate of the inertial measurement unit illustrated in FIG. 14.

FIG. 14 is an exploded perspective view illustrating an inertial measurement unit according to the seventh embodiment. FIG. 15 is a perspective view of a substrate of the inertial measurement unit illustrated in FIG. 14.

An inertial measurement unit (IMU) 2000 illustrated in FIG. 14 is an inertial measurement unit which detects an attitude or a behavior (moment of inertia) of a motion object (mounting apparatus) such as an automobile or a robot. The inertial measurement unit 2000 functions as a so-called six-axis motion sensor including a three-axis acceleration sensor and a three-axis angular velocity sensor.

The inertial measurement unit 2000 is a cuboid of which a planner shape is substantially a square shape. Screw holes 2110 as fixation parts are formed near two vertexes located in a diagonal direction of the square shape. The inertial measurement unit 2000 may be mounted to a mounting surface of a mounting object such as an automobile by inserting two screws into the two screw holes 2110. The inertial measurement unit 2000 may be reduced to a size so as to be mountable on, for example, a smart phone or a digital camera through selection of components or a design change.

The inertial measurement unit 2000 includes an outer case 2100, a bonding member 2200, and a sensor module 2300, and has a configuration in which the sensor module 2300 is inserted into the outer case 2100 via the bonding member 2200. The sensor module 2300 has an inner case 2310 and a substrate 2320.

An outer shape of the outer case 2100 is a cuboidal shape of which a planar shape is a square shape in the same manner as the entire shape of the inertial measurement unit 2000, and the screw holes 2110 are formed near two vertexes located in the diagonal direction of the square. The outer case 2100 has a box shape, and accommodates the sensor module 2300 therein.

The inner case 2310 is a member supporting the substrate 2320, and has a shape accommodated inside the outer case 2100. The inner case 2310 is provided with a depression 2311 for preventing contact with the substrate 2320 or an opening 2312 for exposing a connector 2330 which will be described later. The inner case 2310 is bonded to the outer case 2100 via the bonding member 2200 (for example, a packing impregnated with an adhesive). A lower surface of the inner case 2310 is bonded to the substrate 2320 via an adhesive.

As illustrated in FIG. 15, the connector 2330, an angular velocity sensor 2340z measuring an angular velocity about the Z axis, an acceleration sensor 2350 measuring an acceleration in each of the X axis direction, the Y axis direction, and the Z axis direction, and the like are mounted on an upper surface of the substrate 2320. An angular velocity sensor 2340x measuring an angular velocity about the X axis, and an angular velocity sensor 2340y measuring an angular velocity about the Y axis are mounted on a side surface of the substrate 2320. The physical quantity sensor of the present embodiment may be used as the sensors 2340z.

A control IC 2360 is mounted on a lower surface of the substrate 2320. The control IC 2360 is a micro controller unit (MCU), has a storage section including a nonvolatile memory or an A/D converter built thereinto, and controls each element of the inertial measurement unit 2000. The storage section stores a program for defining an order and contents for measuring acceleration and angular velocity, a program for digitalizing measured data to be incorporated into packet data, accompanying data, and the like. A plurality of other electronic components are mounted on the substrate 2320.

As mentioned above, the inertial measurement unit 2000 has been described. As described above, the inertial measurement unit 2000 includes angular velocity sensors 2340z, 2340x, and 2340y, and the acceleration sensor 2350 as physical quantity sensors, and the control IC 2360 (control circuit) controlling driving of the sensors 2340z, 2340x, 2340y, and 2350. Consequently, it is possible to achieve the effect of the physical quantity sensor, and thus to provide the inertial measurement unit 2000 with high reliability.

Eighth Embodiment

Next, a description will be made of a vehicle positioning apparatus according to an eighth embodiment.

Figure 16:
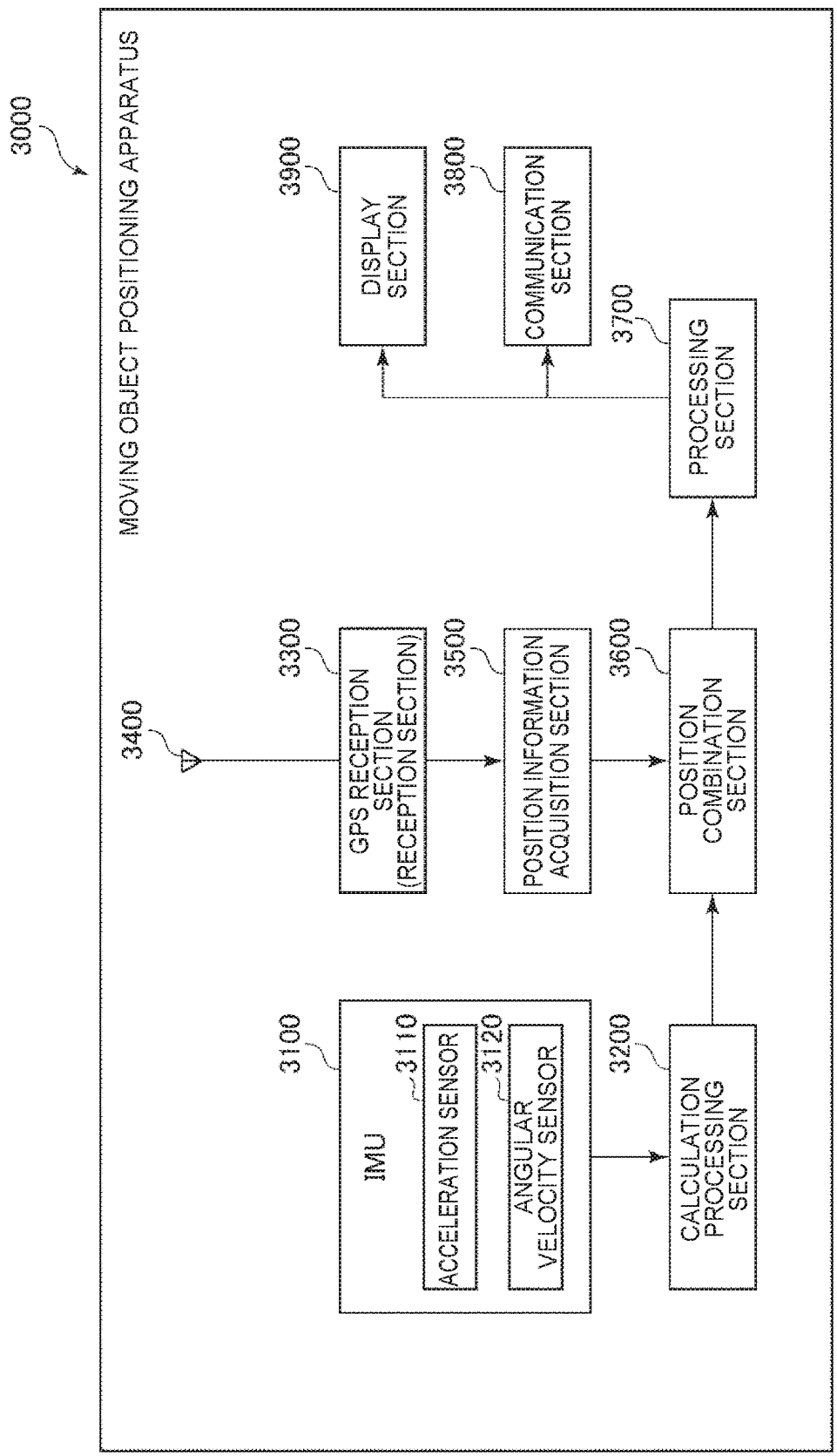
FIG. 16 is a block diagram illustrating the entire system of a vehicle positioning apparatus according to an eighth embodiment.
Figure 17:
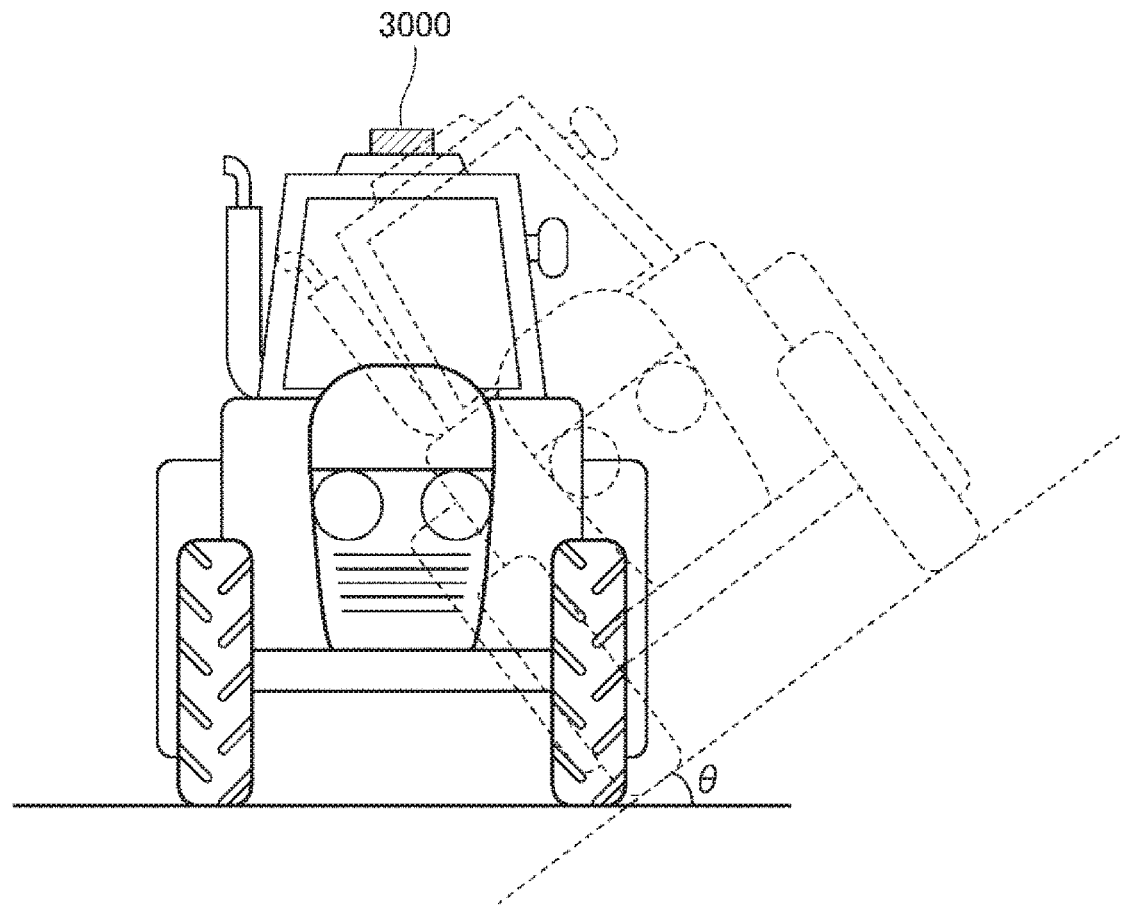
FIG. 17 is a diagram illustrating an operation of the vehicle positioning apparatus illustrated in FIG. 16.

FIG. 16 is a block diagram illustrating the entire system of a vehicle positioning apparatus according to the eighth embodiment. FIG. 17 is a diagram illustrating an operation of the vehicle positioning apparatus illustrated in FIG. 16.

A vehicle positioning apparatus 3000 illustrated in FIG. 16 is an apparatus which is mounted on a vehicle and is used to perform positioning of the vehicle. A vehicle is not particularly limited, and may be any of a bicycle, an automobile (including a four-wheeled vehicle and a motorcycle), an electric train, an airplane, and a ship, and, in the present embodiment, a four-wheeled vehicle will be described. The vehicle positioning apparatus 3000 includes an inertial measurement unit (IMU) 3100, a calculation processing section (calculation processor) 3200, a GPS reception section 3300, a reception antenna 3400, a position information acquisition section 3500, a position combination section 3600, a processing section (processor) 3700, a communication section 3800, and a display section 3900. The inertial measurement unit 2000 may be used as the inertial measurement unit 3100.

The inertial measurement unit 3100 includes a three-axis acceleration sensor 3110 and a three-axis angular velocity sensor 3120. The calculation processing section 3200 receives acceleration data from the acceleration sensor 3110 and receives angular velocity data from the angular velocity sensor 3120, performs inertial navigation calculation process on the data, and outputs inertial navigation positioning data (data including acceleration and an attitude of the vehicle).

The GPS reception section 3300 receives a signal (a GPS carrier wave; a satellite signal on which position information is superimposed) from a GPS satellite via the reception antenna 3400.

The position information acquisition section 3500 outputs GPS positioning data indicating a position (latitude, longitude, and altitude), velocity, and an azimuth of the vehicle positioning apparatus 3000 (vehicle) on the basis of the signal received by the GPS reception section 3300. The GPS positioning data includes status data indicating a reception state, a reception time, and the like.

The position combination section 3600 calculates a position of the vehicle, specifically, a position where the vehicle is traveling on the ground on the basis of the inertial navigation positioning data output from the calculation processing section 3200 and the GPS positioning data output from the position information acquisition section 3500. For example, in a case where positions of the vehicle included in the GPS positioning data are the same as each other, but attitudes of the vehicle are different from each other due to the influence of an inclination of the ground, the vehicle travels at different positions on the ground, as illustrated in FIG. 17. Thus, an accurate position of the vehicle cannot be calculated by using only the GPS positioning data. Therefore, the position combination section 3600 calculates a position where the vehicle travels on the ground by using the inertial navigation positioning data (particularly, data regarding an attitude of the vehicle). The determination can be relatively easily performed through calculation using a trigonometric function (an inclination θ for a vertical direction).

Position data output from the position combination section 3600 is subjected to a predetermined process in the processing section 3700, and is displayed on the display section 3900 as a positioning result. The position data may be transmitted to an external apparatus via the communication section 3800.

As mentioned above, the vehicle positioning apparatus 3000 has been described. As described above, the vehicle positioning apparatus 3000 includes the inertial measurement unit 3100, the GPS reception section 3300 (reception section) which receives a satellite signal on which position information is superimposed from a positioning satellite, the position information acquisition section 3500 (acquisition section) which acquires position information of the GPS reception section 3300 on the basis of the received satellite signal, the calculation processing section 3200 (operating section) which calculates an attitude of a vehicle on the basis of inertial navigation positioning data (inertial data) output from the inertial measurement unit 3100, and the position combination section 3600 (calculation section) which calculates a position of the vehicle by correcting the position information on the basis of the calculated attitude. Consequently, it is possible to achieve the effect of the inertial measurement unit 2000 and thus to provide the vehicle positioning apparatus 3000 with high reliability.

Ninth Embodiment

Next, a description will be made an electronic apparatus according to a ninth embodiment.

Figure 18:
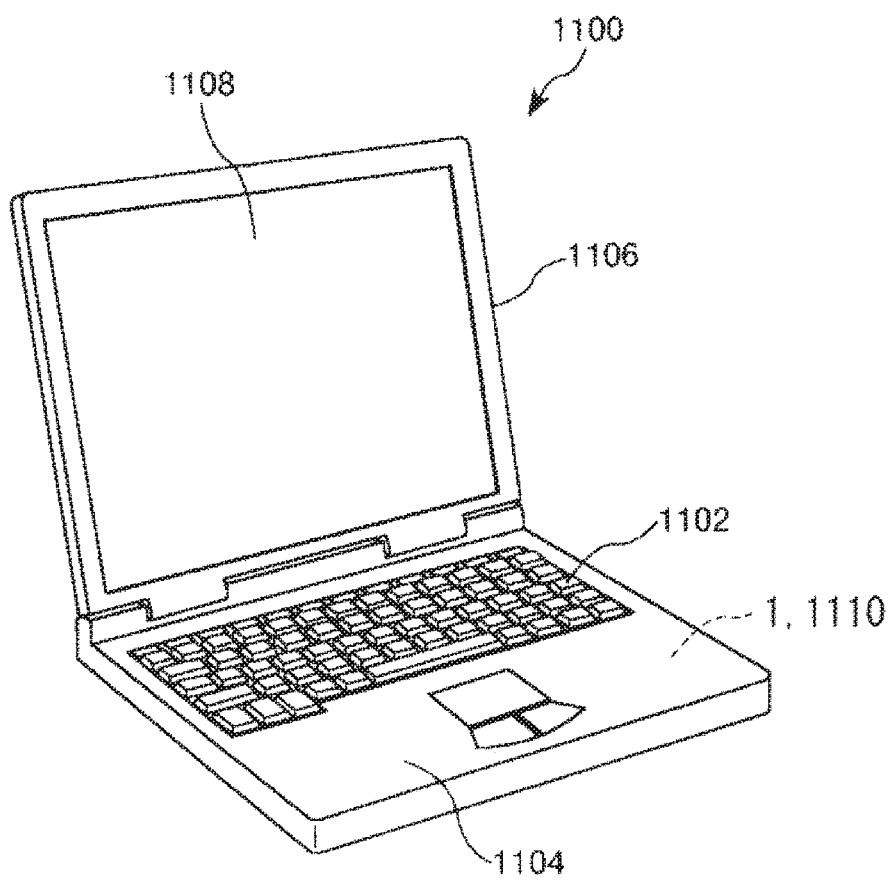
FIG. 18 is a perspective view illustrating an electronic apparatus according to a ninth embodiment.

FIG. 18 is a perspective view illustrating an electronic apparatus according to the ninth embodiment.

A mobile type (or notebook type) personal computer 1100 illustrated in FIG. 18 is an apparatus to which an electronic apparatus of the present embodiment is applied. The personal computer 1100 is configured with a main body section 1104 including a keyboard 1102 and a display unit 1106 including a display section 1108, and the display unit 1106 is rotatably supported with respect to the main body section 1104 via a hinge structure section. The personal computer 1100 includes the physical quantity sensor 1, and a control circuit 1110 (control unit (controller)) which performs control on the basis of a measurement signal output from the physical quantity sensor 1. Any of the above-described physical quantity sensors of the respective embodiments may be used as the physical quantity sensor 1.

Such a personal computer 1100 (electronic apparatus) includes the physical quantity sensor 1, and the control circuit 1110 (control unit) which performs control on the basis of a measurement signal output from the physical quantity sensor 1. Thus, it is possible to achieve the effect of the physical quantity sensor 1 and thus to realize high reliability.

Tenth Embodiment

Next, a description will be made of an electronic apparatus according to a tenth embodiment.

Figure 19:
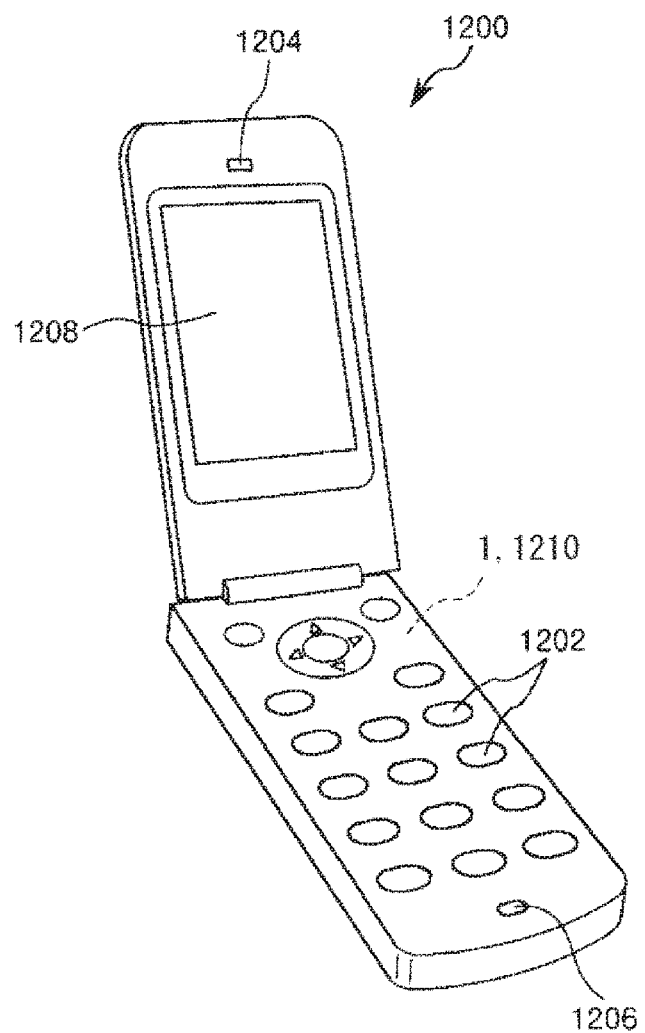
FIG. 19 is a perspective view illustrating an electronic apparatus according to a tenth embodiment.

FIG. 19 is a perspective view illustrating an electronic apparatus according to the tenth embodiment.

A mobile phone 1200 (including a PHS) illustrated in FIG. 19 is a phone to which an electronic apparatus of the present embodiment is applied. The mobile phone 1200 includes an antenna (not illustrated), a plurality of operation buttons 1202, an earpiece 1204, and a mouthpiece 1206, and a display section 1208 is disposed between the operation buttons 1202 and the earpiece 1204. The mobile phone 1200 includes the physical quantity sensor 1, and a control circuit 1210 (control section (controller)) which performs control on the basis of a measurement signal output from the physical quantity sensor 1.

Such a mobile phone 1200 (electronic apparatus) includes the physical quantity sensor 1, and the control circuit 1210 (control section) which performs control on the basis of a measurement signal output from the physical quantity sensor 1. Thus, it is possible to achieve the effect of the physical quantity sensor 1 and thus to realize high reliability.

Eleventh Embodiment

Next, a description will be made of an electronic apparatus according to an eleventh embodiment.

Figure 20:
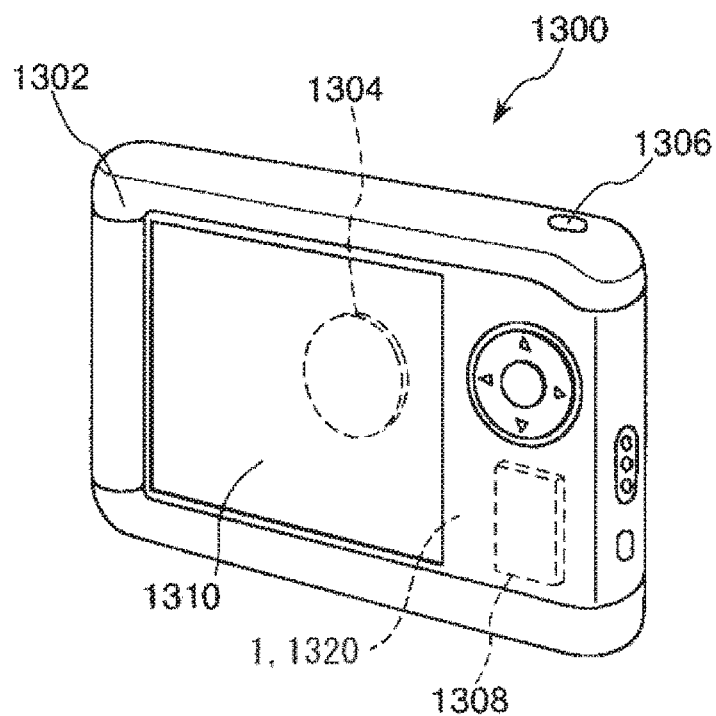
FIG. 20 is a perspective view illustrating an electronic apparatus according to an eleventh embodiment.

FIG. 20 is a perspective view illustrating an electronic apparatus according to the eleventh embodiment.

A digital still camera 1300 illustrated in FIG. 20 is a phone to which an electronic apparatus of the present embodiment is applied. The digital still camera 1300 includes a case 1302, and a display section 1310 is provided on a rear surface of the case 1302. The display section 1310 performs display on the basis of an imaging signal generated by a CCD, and functions as a view finder which displays a subject as an electronic image. A light reception unit 1304 which includes an optical lens (imaging optical system), a CCD, and the like is provided on a front surface side (the rear surface side in FIG. 20) of the case 1302. When a photographer confirms a subject image displayed on the display section 1310 and presses a shutter button 1306, an imaging signal of the CCD at this point is transmitted to and stored in a memory 1308. The digital still camera 1300 includes the physical quantity sensor 1, and a control circuit 1320 (control section (controller)) which performs control on the basis of a measurement signal output from the physical quantity sensor 1. The physical quantity sensor 1 is used for, for example, camera shaking correction.

The digital still camera 1300 (electronic apparatus) includes the physical quantity sensor 1, and a control circuit 1320 (control section (controller)) which performs control on the basis of a measurement signal output from the physical quantity sensor 1. Thus, it is possible to achieve the effect of the physical quantity sensor 1 and thus to realize high reliability.

The electronic apparatus of the present embodiment is applicable not only to the personal computer and the mobile phone of the above-described embodiments and the digital still camera of the present embodiment but also to, for example, a smart phone, a tablet terminal, a watch (including a smart watch), an ink jet type ejection apparatus (for example, an ink jet printer), a laptop type personal computer, a television set, a wearable terminal such as a head mounted display (HMD), a video camera, a video tape recorder, a car navigation apparatus, a pager, an electronic organizer (including a communication function), an electronic dictionary, an electronic calculator, an electronic gaming machine, a word processor, a workstation, a videophone, a security television monitor, electronic binoculars, a POS terminal, a medical apparatus (for example, an electronic thermometer, a sphygmomanometer, a blood glucose monitoring system, an electrocardiographic apparatus, an ultrasonic diagnostic apparatus, or an electronic endoscope), a fish-finder, various measurement apparatuses, an apparatus for mobile terminal base station, meters and gauges (for example, meters and gauges of vehicles, aircrafts, and ships), a flight simulator, and a network server.

Twelfth Embodiment

Next, a description will be made of a portable electronic apparatus according to a twelfth embodiment.

Figure 21:
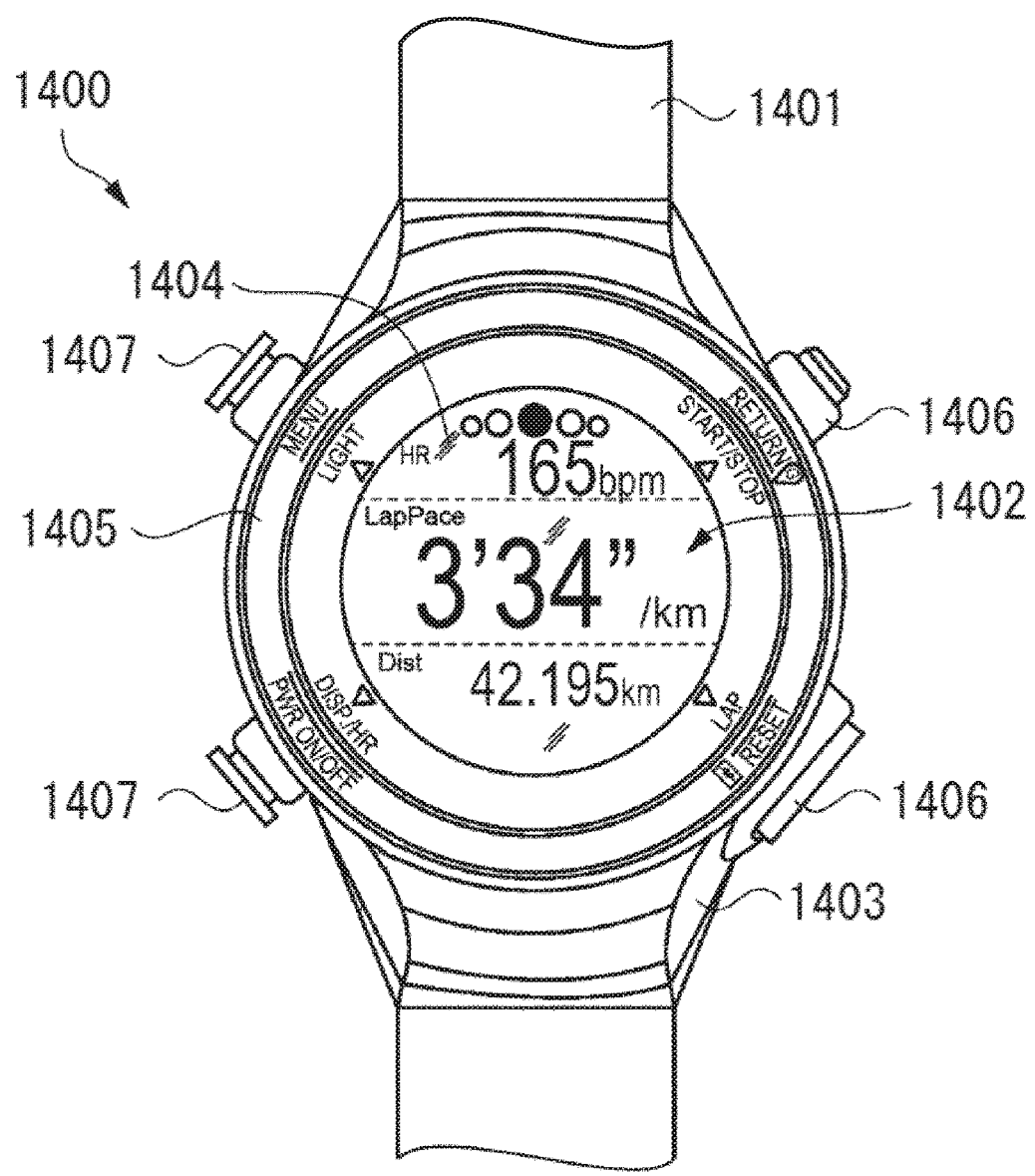
FIG. 21 is a plan view illustrating a portable electronic apparatus according to a twelfth embodiment.
Figure 22:
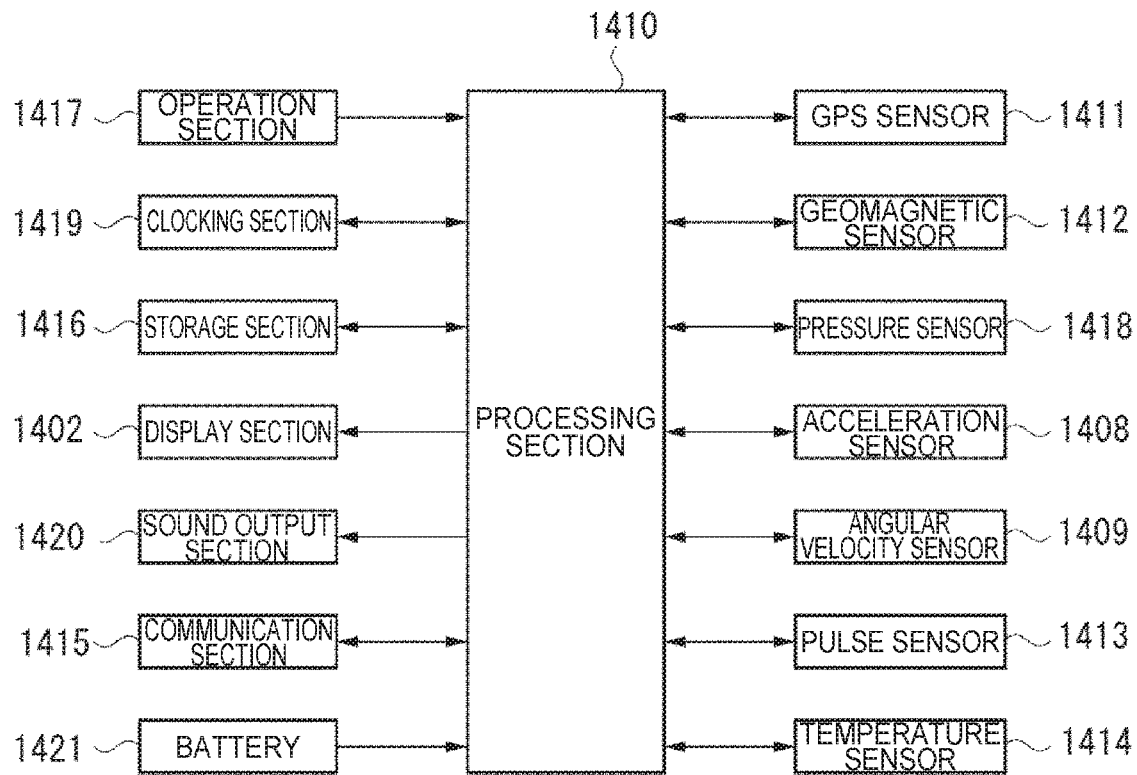
FIG. 22 is a functional block diagram illustrating a schematic configuration of the portable electronic apparatus illustrated in FIG. 21.

FIG. 21 is a plan view illustrating a portable electronic apparatus according to the twelfth embodiment. FIG. 22 is a functional block diagram illustrating a schematic configuration of the portable electronic apparatus illustrated in FIG. 21.

A wristwatch type activity meter 1400 (activity tracker) illustrated in FIG. 21 is a wrist apparatus to which a portable electronic apparatus of the present embodiment is applied. The activity meter 1400 is mounted on a part (subject) such as a user's wrist via a band 1401. The activity meter 1400 is provided with a display section 1402 performing digital display, and can perform wireless communication. A physical quantity sensor according to the present embodiment of the invention is incorporated into the activity meter 1400 as an acceleration sensor 1408 measuring acceleration.

The activity meter 1400 includes a case 1403 in which the acceleration sensor 1408 and the angular velocity sensor 1409 are accommodated, a processing section (processor) 1410 which is accommodated in the case 1403 and processes data output from the acceleration sensor 1408 and the angular velocity sensor 1409, the display section 1402 which is accommodated in the case 1403, and a light transmissive cover 1404 which closes an opening of the case 1403. A bezel 1405 is provided outside the light transmissive cover 1404. A plurality of operation buttons 1406 and 1407 are provided on a side surface of the case 1403.

As illustrated in FIG. 22, the acceleration sensor 1408 measures respective accelerations in three axial directions which intersect (ideally, orthogonal to) each other, and outputs signals (acceleration signal) corresponding to magnitudes and directions of the measured three-axis accelerations. The angular velocity sensor 1409 measures respective angular velocities in three axial directions which intersect (ideally, orthogonal to) each other, and outputs signals (angular velocity signals) corresponding to magnitudes and directions of the measured three-axis angular velocities.

A liquid crystal display (LCD) configuring the display section 1402 displays, according to various measurement modes, for example, position information using a GPS sensor 1411 or a geomagnetic sensor 1412, motion information such as a movement amount or a motion amount using the acceleration sensor 1408 or the angular velocity sensor 1409, biological information such as a pulse rate using a pulse sensor 1413, or time information such as the current time. An environment temperature using a temperature sensor 1414 may be displayed.

A communication section 1415 performs various pieces of control for establishing communication between a user terminal and an information terminal (not illustrated). The communication section 1415 is configured to include a transceiver conforming to a short-range radio communication standard such as Bluetooth (registered trademark) (including Bluetooth Low Energy (BTLE)), Wireless Fidelity (Wi-Fi) (registered trademark), Zigbee (registered trademark), near field communication (NFC), or ANT+ (registered trademark), and a connector conforming to a communication bus standard such as Universal Serial Bus (USB).

The processing section (processor) 1410 is configured with, for example, a micro processing unit (MPU), a digital signal processor (DSP), or an application specific integrated circuit (ASIC). The processing section 1410 performs various processes on the basis of a program stored in a storage section 1416 and a signal which is input from an operation section 1417 (for example, the operation buttons 1406 and 1407). The processes in the processing section 1410 include, for example, a data process on an output signal from each of the GPS sensor 1411, the geomagnetic sensor 1412, a pressure sensor 1418, the acceleration sensor 1408, the angular velocity sensor 1409, the pulse sensor 1413, the temperature sensor 1414, and a clocking section 1419, a display process of displaying an image on the display section 1402, a sound output process of outputting sounds from a sound output section 1420, a communication process of performing communication with an information terminal via the communication section 1415, and a power control process of supplying power to each section from a battery 1421.

The activity meter 1400 may have at least the following functions.

1. Distance: A total distance is measured from measurement starting by using a highly accurate GPS function.

2. Pace: The current traveling pace is displayed through pace distance measurement.

3. Average speed: An average speed is calculated from average speed traveling starting to the current time, and is displayed.

4. Elevation: Elevation is measured and displayed by using the GPS function.

5. Stride: Strides are measured even in a tunnel or the like which GPS electric waves do not reach, and are displayed.

6. Pitch: The number of steps per minute is measured and displayed.

7. Pulse rate: A pulse rate is measured by using the pulse sensor, and is displayed.

8. Gradient: A gradient of the ground is measured and displayed in training or trailing in a mountainous region.

9. Auto lap: Lap measurement is automatically performed in a case where a user runs a predetermined distance or a predetermined time set in advance.

10. Motion calorie consumption: Calorie consumption is displayed.

11. Number of steps: A sum of the number of steps from motion starting is displayed.

The activity meter 1400 (portable electronic apparatus) includes the physical quantity sensor 1, the case 1403 in which the physical quantity sensor 1 is accommodated, the processing section 1410 which is accommodated in the case 1403 and processes data output from the physical quantity sensor 1, the display section 1402 which is accommodated in the case 1403, and the light transmissive cover 1404 which closes the opening of the case 1403. Thus, it is possible to achieve the effect of the physical quantity sensor 1 and thus to realize high reliability.

As described above, the activity meter 1400 includes the GPS sensor 1411 (satellite positioning system), and can thus measure a movement distance or a movement trajectory of a user. Thus, it is possible to provide the highly convenient activity meter 1400.

The activity meter 1400 may be widely applied to a running watch, a runner's watch, a multi-sports compatible runner's watch such as duathlon and triathlon, an outdoor watch, and a satellite positioning system, for example, a GPS watch with a GPS.

In the above description, a global positioning system (GPS) has been described as a satellite positioning system, but other global navigation satellite systems (GNSS) may be used. For example, one, or two or more satellite positioning systems such as a European geostationary-satellite navigation overlay service (EGNOS), a quasi zenith satellite system (QZSS), a global navigation satellite system (GLONASS), GALILEO, and a Beidou navigation satellite system (BeiDou) may be used. As at least one of the satellite positioning systems, a satellite-based augmentation system (SBAS) such as a wide area augmentation system (WAAS) or a European geostationary-satellite navigation overlay service (EGNOS) may be used.

Thirteenth Embodiment

Next, a description will be made of a vehicle according to a thirteenth embodiment.

Figure 23:
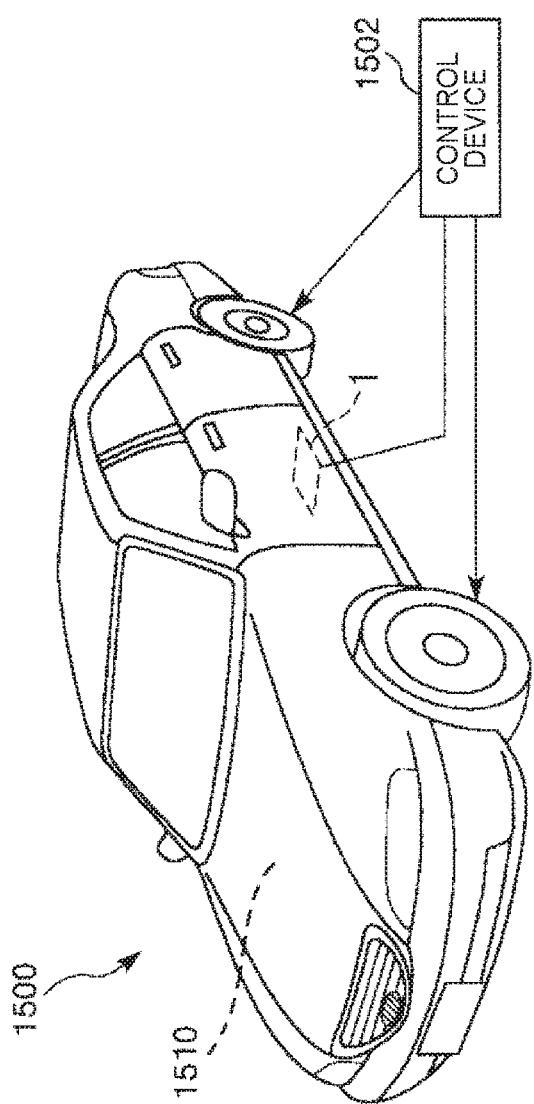
FIG. 23 is a perspective view illustrating a vehicle according to a thirteenth embodiment.

FIG. 23 is a perspective view illustrating a vehicle according to the thirteenth embodiment.

An automobile 1500 illustrated in FIG. 23 is an automobile to which a vehicle of the present embodiment is applied. In FIG. 23, the automobile 1500 includes at least one system 1510 among an engine system, a brake system, and a keyless entry system. The physical quantity sensor 1 is built into the automobile 1500, and a measurement signal in the physical quantity sensor 1 is supplied to a control device 1502. The control device 1502 may control the system 1510 on the basis of the signal.

Such an automobile 1500 (vehicle) includes the physical quantity sensor 1, and the control device 1502 (control section (controller)) which performs control on the basis of a measurement signal output from the physical quantity sensor 1. Thus, it is possible to achieve the effect of the physical quantity sensor 1 and thus to realize high reliability. The automobile 1500 includes at least one system 1510 among an engine system, a brake system, and a keyless entry system, and the control device 1502 controls the system 1510 on the basis of a measurement signal. Consequently, it is possible to control the system 1510 with high accuracy.

The physical quantity sensor 1 is widely applicable to electronic control units (ECUs) such as a car navigation system, a car air conditioner, an antilock brake system (ABS), an air bag, a tire pressure monitoring system (TPMS), engine control, and a battery monitor of a hybrid car or an electric car.

A vehicle is not limited to the automobile 1500, and is applicable to, for example, an airplane, a rocket, an artificial satellite, a ship, an automated guided vehicle (AGV), a bipedal robot, and an unmanned aircraft such as a drone.

As mentioned above, although the physical quantity sensor, the physical quantity sensor device, the composite sensor device, the inertial measurement unit, the vehicle positioning apparatus, the portable electronic apparatus, the electronic apparatus, and the vehicle according to the embodiments have been described in detail, the invention is not limited thereto, and a configuration of each part may be replaced with any configuration having the same function. Any other configuration may be added to the invention. The above-described embodiments may be combined with each other as appropriate.

In the embodiments, a description has been made of a configuration in which the physical quantity sensor measures an acceleration in the X axis direction, but this is only an example, the physical quantity sensor may measure an acceleration in the Y axis direction, and may measure an acceleration in the Z axis direction. In the embodiments, a description has been made of a configuration in which the physical quantity sensor measures acceleration, but a physical quantity measured by the physical quantity sensor is not particularly limited, and may be, for example, an angular velocity. The physical quantity sensor may measure a plurality of physical quantities. The plurality of physical quantities may be physical quantities of an identical kind in different measurement axes (for example, an acceleration in the X axis direction, an acceleration in the Y axis direction, an acceleration in the Z axis direction, an angular velocity about the X axis, an angular velocity about the Y axis, and an angular velocity about Z axis), and may be different physical quantities (for example, an angular velocity about the X axis and an acceleration in the X axis direction).

The entire disclosure of Japanese Patent Application No. 2017-228403 filed Nov. 28, 2017 is expressly incorporated herein by reference.

What is claimed is:

1. A physical quantity sensor comprising:
   a substrate;
   a mount upstanding from the substrate; and
   an element section supported by the mount so as to be spaced apart from the substrate,
   wherein the element section includes:
      a fixed support attached to the mount;
      a movable plate; and
      a support beam that connects the fixed support to the movable plate,
   wherein the movable plate is pivotable about a rotation axis along the support beam,
   wherein the movable plate includes:
      a first mass plate that is located on a first side of the rotation axis and is spaced apart from the fixed support by a first gap;
      a second mass plate that is located on a second side of the rotation axis and is spaced apart from the fixed support by a second gap; and
      a link that is connected to the support beam, and connects the first mass plate to the second mass plate,
   wherein the link includes:
      a first opening having a center,
      a second opening that is entirely located on the first side of the rotation axis, the second opening having a center, the center of the second opening being closer to the first mass plate than the center of the first opening, and a third opening that is entirely located on the second side of the rotation axis, the third opening having a center, the center of the third opening being closer to the second mass plate than the center of the first opening, and wherein, a first central axis extends in a first direction orthogonal to the rotation axis and through the center of the first opening, a second central axis extends in the first direction through the center of the second opening, a third central axis extends in the first direction through the center of the third opening, and each of the second central axis and the third central axis is laterally offset from the first central axis toward an exterior peripheral edge of the link.

2. The physical quantity sensor according to claim 1, wherein the first opening is a first slit that is longitudinally elongated along the first direction.

3. The physical quantity sensor according to claim 2, wherein both ends of the first slit are rounded.

4. The physical quantity sensor according to claim 2, wherein the second opening is a second slit that is longitudinally elongated along the first direction; and the third opening is a third slit that is longitudinally elongated along the first direction.

5. The physical quantity sensor according to claim 2, wherein a width of the first opening defines a band region extending in the first direction along the link; and each of the second opening and the third opening partially overlaps the band region.

6. The physical quantity sensor according to claim 2, wherein a length of the first opening defines a band region extending in a direction along the rotation axis; and each of the second opening and the third opening partially overlaps the band region.

7. The physical quantity sensor according to claim 1, wherein the second opening is a slit that is longitudinally elongated along the first direction; and the third opening is another slit that is longitudinally elongated along the first direction.

8. The physical quantity sensor according to claim 7, wherein both ends of the slit are rounded, and both ends of the another slit are rounded.

9. The physical quantity sensor according to claim 7, wherein a width of the first opening defines a band region extending in the first direction along the link; and each of the second opening and the third opening partially overlaps the band region.

10. The physical quantity sensor according to claim 7, wherein a length of the first opening defines a band region extending in a direction along the rotation axis; and each of the second opening and the third opening partially overlaps the band region.

11. The physical quantity sensor according to claim 1, wherein the second opening further comprises a plurality of second openings sequentially disposed along the first direction; and the third opening further comprises a plurality of third openings sequentially disposed along the first direction.

12. The physical quantity sensor according to claim 11, wherein a width of the first opening defines a band region extending in the first direction along the link; and each of the second opening and the third opening partially overlaps the band region.

13. The physical quantity sensor according to claim 11, wherein a length of the first opening defines a band region extending in a direction along the rotation axis; and each of the second opening and the third opening partially overlaps the band region.

14. The physical quantity sensor according to claim 1, wherein a width of the first opening defines a band region extending in the first direction along the link; and each of the second opening and the third opening partially overlaps the band region.

15. The physical quantity sensor according to claim 1, wherein a length of the first opening defines a band region extending in a direction along the rotation axis; and each of the second opening and the third opening partially overlaps the band region.

16. The physical quantity sensor according to claim 1, wherein the first opening further comprises a plurality of first openings sequentially disposed in a direction parallel to the rotation axis.

17. The physical quantity sensor according to claim 1, wherein the second opening further comprises a plurality of second openings sequentially disposed in a direction parallel to the rotation axis; and the third opening further comprises a plurality of third openings sequentially disposed in a direction parallel to the rotation axis.

18. A physical quantity sensor comprising:
a substrate;
a first mount upstanding from the substrate;
a second mount upstanding from the substrate proximate the first mount;
a proof mass supported by the mount so as to be pivotably suspended relative to the substrate, the proof mass including:
  a first fixed support secured to the first mount;
  a second fixed support secured to the second mount;
    a first T-shaped beam having a cross bar extending in a first direction from the first fixed support to the second fixed support, and a stem extending in a gap between the first and second supports along a rotation axis orthogonal to the first direction;
    a second T-shaped beam having a cross bar extending in the first direction from the first fixed support to the second fixed support, and a stem extending in the gap between the first and second supports along the rotation axis orthogonal to the first direction;
    a first link extending in the first direction at a distal end of the stem of the first beam;
    a second link extending in the first direction at a distal end of the stem of the second beam;
  a first mass plate extending from first ends of the first and second links on a first lateral side of the rotation axis, the first mass plate being spaced apart from the first fixed support by a first gap; and
  a second mass plate extending from second ends of the first and second links on a second lateral side of the rotation axis, the second mass plate being spaced apart from the second fixed support by a second gap;
wherein each of the first and second links includes:
  a first slit extending in the first direction and crossing the rotation axis, the first slit having rounded ends and a major axis extending in the first direction;
  a second slit extending in the first direction and being entirely located between the rotation axis and the first mass plate, the second slit having rounded ends and a major axis extending in the first direction; and
  a third slit extending in the first direction and being entirely located between the rotation axis and the second mass plate, the third slit having rounded ends and a major axis extending in the first direction, wherein the major axis of the second slit and the major axis of the third slit are laterally offset from the major axis of the first slit toward an exterior peripheral edge of the proof mass.

19. The physical quantity sensor according to claim 18, wherein a width of each first slit defines a band region extending in the first direction; and each of the second slits and the third slits partially overlaps the band region, respectively.

20. The physical quantity sensor according to claim 18, wherein a length of each first slit defines a band region extending in a direction along the rotation axis; and each of the second openings and the third openings partially overlaps the band region, respectively.

* * * * *